United States Patent
Mann et al.

(10) Patent No.: US 12,433,882 B2
(45) Date of Patent: Oct. 7, 2025

(54) TREATMENTS FOR AMYOTROPHIC LATERAL SCLEROSIS USING DAZUCORILANT

(71) Applicant: Corcept Therapeutics Incorporated, Menlo Park, CA (US)

(72) Inventors: Grace Mann, Menlo Park, CA (US); Iulia Cristina Tudor, Menlo Park, CA (US); William Guyer, Menlo Park, CA (US); Hazel Hunt, West Sussex (GB); Joseph Custodio, Menlo Park, CA (US)

(73) Assignee: Corcept Therapeutics Incorporated, Redwood City, CA (US)

( * ) Notice: Subject to any disclaimer, the term of this patent is extended or adjusted under 35 U.S.C. 154(b) by 0 days.

(21) Appl. No.: 18/496,134

(22) Filed: Oct. 27, 2023

(65) Prior Publication Data

US 2024/0156806 A1    May 16, 2024

Related U.S. Application Data

(60) Provisional application No. 63/525,044, filed on Jul. 5, 2023, provisional application No. 63/453,989, filed on Mar. 22, 2023, provisional application No. 63/427,305, filed on Nov. 22, 2022, provisional application No. 63/420,409, filed on Oct. 28, 2022.

(51) Int. Cl.
| | |
|---|---|
| *A61K 31/4738* | (2006.01) |
| *A61K 31/4152* | (2006.01) |
| *A61K 31/428* | (2006.01) |
| *A61P 25/28* | (2006.01) |

(52) U.S. Cl.
CPC ...... *A61K 31/4738* (2013.01); *A61K 31/4152* (2013.01); *A61K 31/428* (2013.01); *A61P 25/28* (2018.01)

(58) Field of Classification Search
CPC ............................. A61K 31/4178; A61P 25/28
See application file for complete search history.

(56) References Cited

U.S. PATENT DOCUMENTS

| | | | |
|---|---|---|---|
| 4,963,558 | A | 10/1990 | Hotten et al. |
| 5,696,127 | A | 12/1997 | Jones et al. |
| 6,166,013 | A | 12/2000 | Coghlan et al. |
| 6,583,180 | B2 | 6/2003 | Link et al. |
| 6,680,310 | B2 | 1/2004 | Belanoff et al. |
| 7,576,076 | B2 | 8/2009 | Clark et al. |
| 7,678,813 | B2 | 3/2010 | Clark et al. |

(Continued)

FOREIGN PATENT DOCUMENTS

| | | |
|---|---|---|
| AU | 2009267016 B2 | 7/2014 |
| CL | 2014001241 A1 | 11/2014 |

(Continued)

OTHER PUBLICATIONS

NCT04994743 (Version Oct. 7, 2021; 7 pages) (Accessible from https://classic.clinicaltrials.gov/ct2/history/NCT04994743?A=2&B=2&C=merged#StudyPageTop) (Year: 2021).*
Samadhiya et al. Ann. Indian Acad. Neurol., Jul.-Aug. 2022;25(4):692-697 (Epub Jun. 9, 2022) (Year: 2022).*
Assessing the Effects of Food on Drugs in INDs and NDAs—Clinical Pharmacology Considerations Guidance for Industry (U.S. Department of Health and Human Services Food and Drug Administration Center for Drug Evaluation and Research (CDER), Jun. 2022, 18 pages) (Year: 2022).*
Anonymous, "Amorphous Materials: How Some Solids Flow Like Liquids", Science Daily, CNRS, Available Online at: http://www.sciencedaily.com/releases/2008/07/080704153507.htm, Accessed from Internet on Jan. 16, 2014, pp. 1-3.

(Continued)

*Primary Examiner* — James D. Anderson
(74) *Attorney, Agent, or Firm* — Kilpatrick Townsend & Stockton LLP

(57) ABSTRACT

Applicant discloses methods and compositions for treating a patient suffering from amyotrophic lateral sclerosis (ALS) comprising administration of a heteroaryl ketone fused azadecalin compound. In embodiments, the heteroaryl ketone fused azadecalin compound is dazucorilant: (R)-(1-(4-fluorophenyl)-6-((4-(trifluoromethyl)phenyl) sulfonyl)-4,4a, 5,6,7,8-hexahydro-1-H-pyrazolo[3,4-g]isoquinolin-4a-yl) (pyridin-2-yl)methanone, having the chemical structure illustrated as

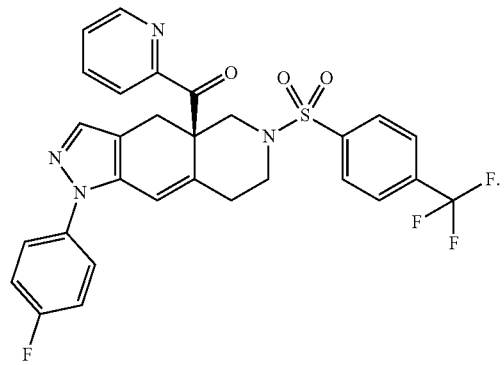

Suitable doses include daily administration of 150 milligrams and 300 milligrams of dazucorilant. Suitable doses include daily administration of dazucorilant with food, or with water, or with food and water. Daily administration of dazucorilant is effective to increase dazucorilant exposure up to about 2-fold when continued for seven days or more. Administration of such a heteroaryl ketone fused azadecalin compound may comprise oral administration, enteral administration, or other administration. Pharmaceutical compositions comprising dazucorilant are useful in the treatment of patients suffering from ALS. Suitable pharmaceutical compositions comprising dazucorilant include, e.g., pharmaceutical compositions for oral administration and pharmaceutical compositions for enteral administration.

16 Claims, 5 Drawing Sheets

(56) References Cited

U.S. PATENT DOCUMENTS

| | | |
|---|---|---|
| 7,790,745 B2 | 9/2010 | Yang et al. |
| 7,799,782 B2 | 9/2010 | Munson et al. |
| 7,928,237 B2 | 4/2011 | Clark et al. |
| 8,003,689 B2 | 8/2011 | Veverka |
| 8,173,674 B2 | 5/2012 | Keil et al. |
| 8,324,203 B2 | 12/2012 | Clark et al. |
| 8,461,172 B2 | 6/2013 | Clark et al. |
| 8,557,839 B2 | 10/2013 | Clark et al. |
| 8,598,154 B2 | 12/2013 | Clark et al. |
| 8,658,128 B2 | 2/2014 | Altschul et al. |
| 8,685,973 B2 | 4/2014 | Clark et al. |
| 8,710,035 B2 | 4/2014 | Pan et al. |
| 8,859,774 B2 | 10/2014 | Hunt et al. |
| 8,889,867 B2 | 11/2014 | Clark et al. |
| 8,969,557 B2 | 3/2015 | Harriman et al. |
| 9,107,926 B2 | 8/2015 | Belvin et al. |
| 9,114,147 B2 | 8/2015 | Altschul et al. |
| 9,149,485 B2 | 10/2015 | Pan et al. |
| 9,273,047 B2 | 3/2016 | Hunt et al. |
| 9,289,436 B2 | 3/2016 | Szmulewitz et al. |
| 9,314,473 B2 | 4/2016 | Altschul et al. |
| 9,320,747 B1 | 4/2016 | Altschul et al. |
| 9,422,323 B2 | 8/2016 | Houpis et al. |
| 9,623,032 B2 | 4/2017 | Pan et al. |
| 9,707,223 B2 | 7/2017 | Hunt et al. |
| 9,801,893 B2 | 10/2017 | Szmulewitz et al. |
| 9,829,495 B2 | 11/2017 | Moraitis |
| 9,943,505 B2 | 4/2018 | Hunt et al. |
| 9,956,216 B2 | 5/2018 | Hunt et al. |
| 10,047,082 B2 | 8/2018 | Hunt et al. |
| 10,117,852 B2 | 11/2018 | Hunt et al. |
| 10,151,763 B2 | 12/2018 | Moraitis |
| 10,213,414 B2 | 2/2019 | Hunt et al. |
| 10,323,034 B2 | 6/2019 | Hunt et al. |
| 10,413,540 B2 | 9/2019 | Hunt |
| 10,441,596 B2 | 10/2019 | Pan et al. |
| 10,449,178 B2 | 10/2019 | Hunt et al. |
| 10,456,392 B2 | 10/2019 | Hunt et al. |
| 10,568,880 B2 | 2/2020 | Hunt |
| 10,973,813 B2 | 4/2021 | Hunt et al. |
| 10,980,797 B2 | 4/2021 | Hunt |
| 11,058,670 B2 | 7/2021 | Moraitis |
| 11,202,784 B2 | 12/2021 | Moraitis et al. |
| 11,327,083 B2 | 5/2022 | Moraitis |
| 11,464,764 B2 | 10/2022 | Scott et al. |
| 11,560,379 B2 | 1/2023 | Hunt et al. |
| 11,576,907 B2 | 2/2023 | Hunt et al. |
| 11,590,113 B2 | 2/2023 | Moraitis |
| 11,648,245 B2 | 5/2023 | Hunt et al. |
| 11,660,295 B2 | 5/2023 | Hunt |
| 11,684,612 B2 | 6/2023 | Moraitis |
| 11,744,837 B2 | 9/2023 | Moraitis |
| 11,890,289 B2 | 2/2024 | Moraitis et al. |
| 2002/0115613 A1 | 8/2002 | Kumar |
| 2003/0064974 A1 | 4/2003 | Belanoff |
| 2004/0102422 A1 | 5/2004 | Gaston |
| 2004/0229855 A1 | 11/2004 | Belanoff |
| 2005/0085464 A1 | 4/2005 | Sapse et al. |
| 2005/0124533 A1 | 6/2005 | Schatzberg et al. |
| 2005/0245588 A1 | 11/2005 | Ali et al. |
| 2006/0063748 A1 | 3/2006 | Belanoff |
| 2006/0223852 A1 | 10/2006 | Gillespie et al. |
| 2007/0128627 A1 | 6/2007 | Simons, Jr. et al. |
| 2007/0203179 A1 | 8/2007 | Clark et al. |
| 2007/0281928 A1 | 12/2007 | Clark et al. |
| 2008/0070950 A1 | 3/2008 | Benjamin et al. |
| 2008/0287419 A1 | 11/2008 | Bruncko et al. |
| 2009/0156672 A1 | 6/2009 | Budunova et al. |
| 2010/0135956 A1 | 6/2010 | Gant et al. |
| 2010/0179115 A1 | 7/2010 | Belanoff |
| 2010/0292477 A1 | 11/2010 | Clark et al. |
| 2011/0166110 A1 | 7/2011 | Clark et al. |
| 2011/0166115 A1 | 7/2011 | Belanoff |
| 2011/0269728 A1 | 11/2011 | Pan et al. |
| 2012/0022121 A1 | 1/2012 | Dalton et al. |
| 2012/0201747 A1 | 8/2012 | Altschul et al. |
| 2012/0220565 A1 | 8/2012 | Clark et al. |
| 2012/0238549 A1 | 9/2012 | Cusack et al. |
| 2013/0225633 A1 | 8/2013 | Hunt et al. |
| 2014/0005158 A1 | 1/2014 | Belanoff |
| 2014/0038926 A1 | 2/2014 | Hunt et al. |
| 2014/0186367 A1 | 7/2014 | Pan |
| 2014/0315866 A1 | 10/2014 | Pan et al. |
| 2014/0341849 A1 | 11/2014 | Pan et al. |
| 2015/0010503 A1 | 1/2015 | Szmulewitz et al. |
| 2015/0080389 A1 | 3/2015 | Hunt et al. |
| 2015/0118244 A1 | 4/2015 | Shahabi et al. |
| 2015/0148341 A1 | 5/2015 | Hunt et al. |
| 2015/0196640 A1 | 7/2015 | Cacase et al. |
| 2015/0346210 A1 | 12/2015 | Nitta et al. |
| 2016/0151388 A1 | 6/2016 | Szmulewitz et al. |
| 2016/0215049 A1 | 7/2016 | Feldhaus et al. |
| 2017/0020860 A1 | 1/2017 | Hunt et al. |
| 2017/0182066 A1 | 6/2017 | Pan et al. |
| 2017/0273972 A1 | 9/2017 | Hunt et al. |
| 2018/0036318 A1 | 2/2018 | Szmulewitz et al. |
| 2018/0125856 A1 | 5/2018 | Moraitis et al. |
| 2018/0193313 A1 | 7/2018 | Hunt et al. |
| 2018/0280378 A1 | 10/2018 | Hunt |
| 2018/0325891 A1 | 11/2018 | Scott |
| 2020/0197372 A1 | 6/2020 | Scott et al. |
| 2021/0128584 A1 | 5/2021 | Belanoff |
| 2021/0369701 A1 | 12/2021 | Hunt et al. |

FOREIGN PATENT DOCUMENTS

| | | |
|---|---|---|
| CL | 2014003162 A1 | 2/2015 |
| CL | 2018002467 A1 | 11/2018 |
| CL | 56987 | 12/2018 |
| CN | 107530435 A | 1/2018 |
| EP | 0145121 A2 | 6/1985 |
| EP | 0375210 A1 | 6/1990 |
| EP | 375210 B1 | 5/1995 |
| EP | 2306830 A4 | 6/2012 |
| EP | 2817019 A1 | 12/2014 |
| EP | 2817019 A4 | 4/2016 |
| EP | 3111950 | 1/2017 |
| HK | 1228803 | 11/2017 |
| HK | 1230921 | 12/2017 |
| IN | 10279/DELNP/2014 | 8/2016 |
| IN | 201617021323 | 8/2016 |
| JP | 322220 B | 4/1957 |
| JP | 04368384 A | 12/1992 |
| JP | 09505030 A | 5/1997 |
| JP | 2002506032 A | 2/2002 |
| JP | 2002544271 A | 12/2002 |
| JP | 2008520606 A | 6/2008 |
| JP | 2014530812 A | 11/2014 |
| JP | 6172871 B | 7/2017 |
| JP | 201812734 A | 1/2018 |
| PE | 9466 | 4/2019 |
| RU | 2381217 C2 | 2/2010 |
| RU | 2009126745 A | 1/2011 |
| RU | 2014151207 A | 7/2016 |
| RU | 2014152625 A | 7/2016 |
| RU | 2639867 C2 | 12/2017 |
| RU | 2674983 C1 | 12/2018 |
| SG | 11201604077 W | 8/2019 |
| WO | 9410150 A1 | 5/1994 |
| WO | 9504734 A1 | 2/1995 |
| WO | 9945925 A1 | 9/1999 |
| WO | 0069846 A1 | 11/2000 |
| WO | 03015692 A2 | 2/2003 |
| WO | 03061651 A1 | 7/2003 |
| WO | 2004065351 A1 | 8/2004 |
| WO | 2005087769 A1 | 9/2005 |
| WO | 2009058944 A2 | 5/2009 |
| WO | 2009064738 A2 | 5/2009 |
| WO | 2010132445 A1 | 11/2010 |
| WO | 2011113015 A2 | 9/2011 |
| WO | 2011113015 A3 | 10/2011 |
| WO | 2012027702 A1 | 3/2012 |
| WO | 2012094618 A1 | 7/2012 |
| WO | 2013039916 A1 | 3/2013 |

(56) References Cited

FOREIGN PATENT DOCUMENTS

| WO | 2013177559 A2 | 11/2013 |
|---|---|---|
| WO | 2015061752 A1 | 4/2015 |
| WO | 2015077414 A1 | 5/2015 |
| WO | 2015077530 A1 | 5/2015 |
| WO | 2015095811 A2 | 6/2015 |
| WO | 2016014365 A1 | 1/2016 |
| WO | 2016055533 A1 | 4/2016 |
| WO | 2016141365 A1 | 9/2016 |
| WO | 2017023694 A1 | 2/2017 |
| WO | 2017151613 A1 | 9/2017 |
| WO | 2018049255 A1 | 3/2018 |
| WO | 2020172501 A1 | 8/2020 |
| WO | 2022031642 A2 | 2/2022 |
| ZA | 201408182 B | 9/2017 |

OTHER PUBLICATIONS

Anonymous, "Amorphous Solid", Wikepedia, Available Online at: http://en.wikipedia.org/wiki/Amorphous_solid, Jan. 16, 2014, 3 pages.
Anonymous, "Chemical Processing", Available Online at: https://www.chemicalprocessing.com/, 2004, 8 pages.
Anonymous, "Database Crossfile Beilstein", Beilstein Institut Zur Foerderung der Chemischen Wissenschaft, Accession No. 101172-52-5 (BRN), Jun. 27, 1988, 3 pages.
Anonymous "Highlights of Prescribing Information", KORLYM® (Mifepristone), Concept Therapeutics Incorporated, 2017, 7 pages.
Anonymous, "Mifeprex (Mifepristone) Tablets, 200mg For Oral Administration Only", Mifeprex (Mifepristone) Label, Rev 2, Jul. 19, 2005, pp. 1-20.
Anonymous, "Preservatives and Antioxidants Database", Available Online at: CompoundingToday.com I Preservatives and Antioxidants Database, Oct. 29, 2005, 3 pages.
Anonymous, "Propylene Glycol Monocaprylate Type II", Capryol® 90, Available Online at: https://www.gattefosse.com/pharmaceuticals-products/capryol-90, May 28, 2017, 3 pages.
Anonymous, "Study of Drug 1 (Enzalutamide) Plus Drug 2 (Relacorilant) for Patients With Prostate Cancer", ClinicaiTrials.gov, Available Online at: www.clinicaltrials.gov/ct2/show/NCT03674814, Accessed from internet on Apr. 10, 2019, 9 pages.
Anonymous , "Study of Relacorilant in Combination with Nab-Paclitaxel for Patients with Recurrent Platinum-Resistant Ovarian, Fallopian Tube, or Primary Peritoneal Cancer", ClinicalTrials.gov, Available Online at: www.clinicaltrials.gov/ct2/show/NCT03776812, Accessed from Internet on Apr. 30, 2019, 11 pages.
Anonymous, "Study to Evaluate Cort125134 in Combination with Nab-Paclitaxel in Patients with Solid Tumors", ClinicalTrials.gov, Available Online at: www.clinicaltrials.gov/ct2/show/NCT02762981, Accessed from internet on Apr. 30, 2019, 7 pages.
Aherne et al., "Finding the Needle in the Haystack: Why Highthroughput Screening is Good for Your Health", Breast Cancer Research, vol. 4, No. 4, 2002, pp. 148-154.
Aisen et al., "A Randomized Controlled Trial of Prednisone in Alzheimer's Disease. Alzheimer's Disease Cooperative Study", Neurology, vol. 54, No. 3, Feb. 8, 2000, pp. 1-2.
Akiyama et al., "Inflammation and Alzheimer's Disease", Neurobiology of Aging, vol. 21, No. 3, May-Jun. 2000, 66 pages.
Amiri-Kordestani et al., "Targeting MDR in Breast and Lung Cancer: Discriminating Its Potential Importance From the Failure of Drug Resistance Reversal Studies", Drug Resistance Updates, vol. 15, No. 0, Feb. 2012, pp. 50-61.
Antonarakis et al., "Emerging Therapeutic Approaches in the Management of Metastatic Castration Resistant Prostate Cancer", Prostate Cancer and Prostatic Diseases, vol. 14, Sep. 2011, pp. 206-218.
Arora et al., "Glucocorticoid Receptor Confers Resistance to Antiandrogens by Bypassing Androgen Receptor Blockade", Cell, vol. 155, No. 6, Dec. 5, 2013, pp. 1309-1322.
Arrat et al., "ACTH (Acthar Gel) Reduces Toxic SOD1 Protein Linked to Amyotrophic Lateral Sclerosis in Transgenic Mice: A Novel Observation", PLoS One, vol. 10, No. 5, May 8, 2015, pp. 1-12.

Attard et al., "Translating Scientific Advancement into Clinical Benefit for Castration-Resistant Prostate Cancer Patients", Clinical Cancer Research, vol. 1, No. 12, Jun. 15, 2011, pp. 3867-3875.
Barth et al., "Structural and Stereoelectronic Requirements for the Inhibition of Mammalian 2,3-Oxidosqualene Cyclase by Substituted Isoquinoline Derivatives", Journal of Medicinal Chemistry, vol. 39, No. 12, American Chemical Society, Jun. 7, 1996, pp. 2302-2312.
Behl et al., "Protection Against Oxidative Stress-Induced Neuronal Cell Death—A Novel Role for RU486", European Journal of Neuroscience, vol. 9, No. 5, May 1997, pp. 912-920.
Belanoff et al., "Selective Glucocorticoid Receptor {Type II) Antagonists Prevent Weight Gain Caused by Olanzapine in Rats", European Journal of Pharmacology, vol. 655, No. 1-3, Mar. 25, 2011, pp. 117-120.
Belova et al., "Glucocorticoid Receptor Expression in Breast Cancer Associates with Older Patient Age", Breast Cancer Research and Treatment, vol. 116, No. 3, Aug. 2009, pp. 441-447.
Benagiano et al., "Selective Progesterone Receptor Modulators 3: Use in Oncology, Endocrinology and Psychiatry", Expert Opinion. Pharmacother, vol. 9, No. 14, Oct. 2008, pp. 2487-2496.
Block et al., "Glucocorticoid Receptor Expression in 20 Solid Tumor Types Using Immunohistochemistry Assay", Cancer Management and Research, vol. 9, Mar. 6, 2017, pp. 65-72.
Bolton et al., "Cell- and Gene-Specific Regulation of Primary Target Genes by the Androgen Receptor", Genes Development, vol. 21, No. 16, Aug. 15, 2007, pp. 2005-2017.
Bolton et al., "The Effects of the Anti-Glucocorticoid RU 38486 on Steroid-Abstract Mediated Suppression of Experimental Allergic Encephalomyelitis (EAE) in the Lewis Rat", Life Sciences, vol. 45, No. 1, 1989, pp. 97-104.
Brusaferri et al., "Steroids for Multiple Sclerosis and Optic Neuritis: A Meta-Abstract Analysis of Randomized Controlled Clinical Trials", Journal of Neurology, vol. 247, No. 6, Jun. 2000, pp. 435-442.
Caccamo et al., "Glucocorticoids Exacerbate Cognitive Deficits in TDP-25 Transgenic Mice Via a Glutathionemediated Mechanism: Implications for Aging, Stress and TDP-43 Proteinopathies", The Journal of Neuroscience, vol. 33, No. 3, Jan. 16, 2013, pp. 906-913.
Carri et al., "Neurodegeneration in Amyotrophic Lateral Sclerosis: The Role of Oxidative Stress and Altered Homeostasis of Metals", Brain Research Bulletin, vol. 61, No. 4, Aug. 30, 2003, pp. 365-374.
Chan et al., "Prognostic Significance of Gleason Score 3+4 versus Gleason Score 4+3 Tumor at Radical Prostatectomy", Adult Urology, vol. 56, No. 5, Nov. 2000, pp. 823-827.
Check et al., "Evidence that Mifepristone, a Progesterone Receptor Antagonist, Can Cross the Blood Brain Barrier and Provide Palliative Benefits for Glioblastoma Multiforme Grade IV", Anticancer Research, vol. 34, No. 5, May 2014, pp. 2385-2388.
Check et al., "Mifepristone Causing Complete Remission of Rapidly Advancing Leukemia with Measurement of Progesterone-Induced Blocking Factor", Anticancer Research, vol. 34, No. 5, May 2014, pp. 2413-2416.
Chen et al., "Androgen and Glucocorticoid Receptor Heterodimer Formation: A Possible Mechanism for Mutual Inhibition of Transcriptional Activity", Journal of Biological Chemistry, vol. 272, No. 22, May 30, 1997, pp. 14087-14092.
Chen et al., "Mechanism of the Reversal Effect of Mifepristone on Drug Resistance of the Human Cervical Cancer Cell Line HELA/MMC", Genetics and Molecular Research, vol. 13, No. 1, Feb. 27, 2014, pp. 1288-1295.
Chi et al., "Castration-Resistant Prostate Cancer: From New Pathophysiology to New Treatment Targets", European Urology, vol. 56, No. 4, Oct. 2009, pp. 594-605.
Cho et al., "Role of Activation function Domain-1, DNA Binding, and Coactivator GRIP1 in the Expression of Partial Agonist Activity of Glucocorticoid Receptor-Antagonist Complexes", Biochemistry, vol. 44, No. 9, Mar. 8, 2005, pp. 3547-3561.
Christoffers et al., "Absolute Configuration of Methyl (+)-1,2,3,4,6,7,8,8a-Octahydro-6-isoquinolone-8a-carboxylate and Stereochemistry of a Copper-Catalyzed Asymmetric Michael Reaction", Zeitschrift Fuer Naturforschung B Chemical Sciences, vol. 59, No. 4, Apr. 1, 2004, pp. 375-379.

(56) References Cited

OTHER PUBLICATIONS

Christoffers et al., "Copper-Catalyzed Asymmetric Michael Reactions with α-Amino Acid Amides: Synthesis of an Optically Active Piperidine Derivative", Wiley Online Library, vol. 2002, No. 9, May 2002, pp. 1505-1508.

Christoffers et al., "Synthesis of an Optically Active Decahydro-6-Isoquinolone Scaffold with a Quaternary Stereocenter", Wiley Online Library, vol. 2004, No. 12, Jun. 2004, pp. 2701-2706.

Christoffers, "Transformation of an Optically Active Decahydro-6-isoquinolone Scaffold: Perfect Felkin-Anh Diastereoselectivity", Organic Letters, vol. 6, No. 7, American Chemical Society, Feb. 3, 2004, pp. 1171-1173.

Chu, "Connecting Via Winsock to SIN at PTO-STN on Port 23", STN-12691012, STN International, Mar. 19, 2012, 62 pages.

Chu et al., "Successful Long-Term Treatment of Refractory Cushing's Disease with High-Dose Mifepristone (RU 486)", The Journal of Clinical Endocrinology & Metabolism, vol. 86, No. 8, Aug. 2001, pp. 3568-3573.

Clark et al., "1H-Pyrazolo[3,4-g]Hexahydro-Isoquinolines as Selective Glucocorticoid Receptor Antagonists with High Functional Activity", Bioorganic & Medicinal Chemistry Letters, vol. 18, No. 4, Feb. 15, 2008, pp. 1312-1317.

Clark et al., "2-Benzenesulfonyl-8a-Benzyl-Hexahydro-2h-Isoquinolin-6-ones as Selective Glucocorticoid Receptor Antagonists", Bioorganic & Medicinal Chemistry Letters, vol. 17, No. 20, Oct. 15, 2007, pp. 5704-5708.

Clark, "Glucocorticoid Receptor Antagonists", Current Topics in Medicinal Chemistry, vol. 8, No. 9, Jun. 1, 2008, pp. 813-838.

Cleutjens et al., "Both Androgen Receptor and Glucocorticoid Receptor Are Able to Induce Prostate-Specific Antigen Expression, but Differ in Their Growth-Stimulating Properties of LNCaP Cells", Endocrinology, vol. 138, No. 12, Dec. 1, 1997, pp. 5293-5300.

Colleoni et al., "Response to Primary Chemotherapy in Breast Cancer Patients with Tumors Not Expressing Estrogen and Progesterone Receptors", Annals of Oncology, vol. 11, No. 8, Aug. 1, 2000, pp. 1057-1059.

Cossu et al., "The Role of Mifepristone in Meningiomas Management: A Systematic Review of the Literature", BioMed Research International, vol. 2015, Jul. 2015, pp. 1-11.

Cummings et al., "Treatment Combinations for Alzheimer's Disease: Current and Future Pharmacotherapy Options", Journal of Alzheimer's Disease, vol. 67, Jan. 2019, pp. 779-794.

Damia et al., "Contemporary Pre-clinical Development of Anticancer Agents—What are the Optimal Preclinical Models", European Journal of Cancer, vol. 45, No. 16, Nov. 2009, pp. 2768-2781.

Davies et al., "Association of Glucocorticoid Receptors with Prostate Nuclear Sites for Androgen Receptors and with Androgen Response Elements", Journal of Molecular Endocrinology, vol. 5, No. 2, Oct. 1990, pp. 117-127.

De Bono et al., "Abiraterone and Increased Survival in Metastatic Prostate Cancer", New England Journal of Medicine, vol. 364, No. 21, May 26, 2011, 19 pages.

Dennis, "Off by a Whisker", Nature, vol. 442, Aug. 7, 2006, pp. 739-741.

Desmedt et al., "Strong Time Dependence of the 76-Gene Prognostic Signature for Node-Negative Breast Cancer Patients in the TRANSBIG Multicenter Independent Validation Series", Clinical Cancer Research, vol. 13, No. 11, Jun. 1, 2007, pp. 3207-3214.

Di Lorenzo et al., "Castration-Resistant Prostate Cancer", Drugs, vol. 70, No. 8, May 2010, pp. 983-1000.

Dibas et al., "Glucocorticoid Therapy and Ocular Hypertension", European Journal of Pharmacology, vol. 787, Sep. 15, 2016, pp. 1-33.

Dinkel et al., "Novel Glucocorticoid Effects on Acute Inflammation in the CNS", Journal of Neurochemistry, vol. 84, Feb. 2003, pp. 705-716.

Donovan et al., "Androgen Receptor Expression is Associated with Prostate Cancer-Specific Survival in Castrate Patients with Metastatic Disease", Bob Jones University International, vol. 105, No. 4, Feb. 2010, pp. 462-467.

Efstathiou et al., "Molecular Characterization of Enzalutamide-treated Bone Metastatic Castration-resistant Prostate Cancer", European Urology, vol. 67, No. 1, Jan. 2015, pp. 53-60.

Elmore et al., "Nonsteroidal Selective Glucocorticoid Modulators: The Effect of C-5 Alkyl Substitution on the Transcriptional Activation/Repression Profile of 2,5-Dihydro-10-Methoxy-2,2,4-Trimethyl-1H-[1]Benzopyrano[3,4-f]Quinolines", American Chemical Society, Journal of Medicinal Chemistry, vol. 44, No. 25, Dec. 1, 2001, pp. 4481-4491.

Evans et al., "CNS-Targeted Glucocorticoid Reduces Pathology in Mouse Model of Amyotrophic Lateral Sclerosis", Acta Neuropathologica Communications, vol. 2, No. 66, Jun. 13, 2014, pp. 1-13.

Fakih et al., "Glucocorticoids and Treatment of Prostate Cancer: A Preclinical and Clinical Review", Urology, vol. 60, No. 4, Oct. 2002, pp. 553-561.

Fidler et al., "Disease Progression in a Mouse Model of Amyotrophic Lateral Sclerosis: The Influence of Chronic Stress and Corticosterone", The FASEB Journal, vol. 25, Dec. 2011, pp. 4369-4377.

Fiorentino et al., "Blood and Tissue Biomarkers in Prostate Cancer: State of the Art", Urologic Clinics of North America, vol. 37, No. 1, Feb. 2010, pp. 1-14.

Flexner et al., "HIV Drug Development: The Next 25 Years", Nature Reviews, Drug Discovery, Dec. 2007, pp. 959-966.

Fradet, "PSA and Beyond: Biomarkers in Prostate Cancer Diagnosis and Prognosis", Current Opinion in Urology, vol. 19, No. 3, May 2009, pp. 243-246.

Gaddy et al., "Mifepristone Induces Growth Arrest, Caspase Activation, and Apoptosis of Estrogen Receptor-Expressing, Antiestrogen-Resistant Breast Cancer Cells", Clinical Cancer Research, vol. 10, No. 15, Aug. 1, 2004, pp. 5215-5225.

Gargiulo-Monachelli et al., "Circulating Gonadal and Adrenal Steroids in Amyotrophic Lateral Sclerosis: Possible Markers of Susceptibility and Outcome", Hormone and Metabolic Research, vol. 46, Jun. 2014, pp. 433-439.

Genck, "Make the Most of Antisolvent Crystallization: A Number of Factors Can Affect Solids' Formation", Chemical Processing, Available Online at: https://www.chemicalprocessing.com/articles/2010/210/, Nov. 8, 2010, 8 pages.

Ghoumari et al., "Mifepristone (RU486) Protects Purkinje Cells from Cell Death in Organotypic Slice Cultures of Postnatal Rat and Mouse Cerebellum", Proceedings of the National Academy of Sciences, vol. 100, No. 13, Jun. 24, 2003, pp. 7953-7958.

Gonzalez et al., "Glucocorticoid Receptors and Actions in the Spinal Cord of the Wobbler Mouse, A Model for Neurodegenerative Diseases", Journal of Steroid Biochemistry and Molecular Biology, vol. 60, No. 3-4, Feb. 1997, pp. 205-213.

Grover et al., "The Initiation of Breast and Prostate Cancer", Carcinogenesis, vol. 23, No. 7, Jul. 1, 2002, pp. 1095-1102.

Gulliver, "Xenobiotics and the Glucocorticoid Receptor", Toxicology and Applied Pharmacology, vol. 319, Mar. 15, 2017, pp. 69-79.

Guo et al., "A Novel Androgen Receptor Splice Variant Is Up-Regulated During Prostate Cancer Progression and Promotes Androgen Depletion-Resistant Growth", Cancer Research, vol. 69, No. 6, Mar. 15, 2009, pp. 2305-2313.

Gupta et al., "Studies on Carboxylation in Heterocyclic Systems", Journal of Scientific and Industrial Research, vol. 20B, Aug. 1961, pp. 394-397.

Gura, "Systems for Identifying New Drugs are Often Faulty", Science, Cancer Models, vol. 278, No. 5340, Nov. 7, 1997, pp. 1041-1042.

Han et al., "Biochemical (Prostate Specific Antigen) Recurrence Probability Following Radical Prostatectomy for Clinically Localized Prostate Cancer", The Journal of Urology, vol. 169, No. 2, Feb. 2003, pp. 517-523.

He et al., "Discovery of a Highly Potent Glucocorticoid for Asthma Treatment", Cell Discovery, vol. 1, No. 15035, Dec. 15, 2015, 13 pages.

Hein et al., "Click Chemistry, A powerful Tool for Pharmaceutical Sciences", Pharmaceutical Research, vol. 25, No. 10, Oct. 2008, pp. 2216-2230.

(56) References Cited

OTHER PUBLICATIONS

Hemmi et al., "Dramatic Response of Dropped Head Sign to Treatment with Steroid in Parkinson's Disease: Report of Three Cases", Internal Medicine, vol. 50, Jan. 2011, pp. 757-761.
Henderson et al., "Estrogens as a Cause of Human Cancer: the Richard and Hinda Rosenthal Foundation Award Lecture", Cancer Research, vol. 48, No. 2, Jan. 15, 1988, pp. 246-253.
Hinrichs et al., "Glucocorticoids Do Not Inhibit Antitumor Activity of Activated CD8+ T Cells", Journal of Immunotherapy, vol. 28, No. 6, 2005, 17 pages.
Ho et al., "A Complex Response Element in Intron 1 of the Androgen-Regulated 20-kDa Protein Gene Displays Cell Type-Dependent Androgen Receptor Specificity", Journal of Biological Chemistry, vol. 268, No. 36, Dec. 25, 1993, pp. 27226-27235.
Hsin et al., "Stereoselective Synthesis of Morphine Fragments Trans- and Cis-Octahydro-1H-Benzo[4,5]Furo[3,2-e]Isoquinolines", Elsevier Lmitited, Tetrahedron, vol. 61, No. 2, Jan. 10, 2005, pp. 513-520.
Huang et al., "Reversal Effect of Mifepristone on Adriamycin Resistance in Human Breast Cancer Cell Line MCF-7/ADM in Vitro and in Vivo", Journal of Central South University, Medical Sciences, vol. 35, No. 6, Jun. 2010, pp. 576-583.
Hunt et al., "1H-Pyrazolo[3,4-g]Hexahydro-Isoquinolines as Potent GR Antagonists with Reduced hERG Inhibition and an Improved Pharmacokinetic Profile", Bioorganic & Medicinal Chemistry Letters, vol. 25, No. 24, Dec. 15, 2015, pp. 5720-5725.
Hunt et al., "Assessment of Safety, Tolerability, Pharmacokinetics, and Pharmacological Effect of Orally Administered CORT125134: An Adaptive, Double-Blind, Randomized, Placebo-Controlled Phase 1 Clinical Study", Clinical Pharmacology in Drug Development, vol. 7, No. 4, May 2018, pp. 408-421.
Hunt et al., "Identification of the Clinical Candidate (R)-(1-(4-Fluorophenyl)-6-((1-Methyl-1H-Pyrazol-4-yl)Sulfonyl)-4,4a,5,6,7,8-Hexahydro-1H-Pyrazolo[3,4-g]Isoquinolin-4a-yl)(4-(Trifluoromethyl)Pyridin-2-yl)Methanone (CORT125134): A Selective Glucocorticoid Receptor", Journal of Medicinal Chemistry, vol. 60, No. 8, Apr. 27, 2017, pp. 3405-3421.
Isikbay et al., "Glucocorticoid Receptor Activity Contributes to Resistance to Androgen-Targeted Therapy in Prostate Cancer", Hormones and Cancer, vol. 5, No. 2, Mar. 2014, pp. 72-89.
Jannin et al., "Polyoxylglycerides and Glycerides: Effects of Manufacturing Parameters on API Stability, Excipient Functionality and Processing", International Journal of Pharmaceutics, vol. 466, May 15, 2014, pp. 109-121.
Jemal et al., "Cancer Statistics", CA: A Cancer Journal for Clinicians, vol. 60, No. 5, Sep.-Oct. 2010, pp. 277-300.
Johnson et al., "Relationships Between Drug Activity in NCI Preclinical in Vitro and in Vivo Models and Early Clinical Trials", British Journal of Cancer, vol. 84, No. 10, May 18, 2001, pp. 1424-1431.
Kach et al., "Glucocorticoid Receptor Signaling in Breast and Prostate Cancers: Emergence as a Therapeutic Target", Science Translational Medicine, vol. 7, No. 305, Sep. 16, 2015, 9 pages.
Kach et al., "Selective Glucocorticoid Receptor Modulators (SGRMs) Delay Castrate-Resistant Prostate Cancer Growth", Molecular Cancer Therapeutics, vol. 16, No. 8, Aug. 2017, pp. 1680-1692.
Kadmiel et al., "Glucocorticoid Receptor Signaling in Health and Disease", Trends in Pharmacological Sciences, vol. 34, No. 9, Sep. 2013, pp. 518-530.
Karantanos et al., "Understanding the Mechanisms of Androgen Deprivation Resistance in Prostate Cancer at the Molecular Level", European Urology, vol. 67, No. 1, 2015, pp. 470-479.
Keen et al., "The Biology of Breast Carcinoma", Cancer, vol. 97, No. 3, Feb. 1, 2003, pp. 825-833.
Kim et al., "Current Treatment Strategies for Castration-Resistant Prostate Cancer", Korean Journal of Urology, vol. 52, No. 3, Mar. 2011, pp. 157-165.
Klein et al., "Analyzing Survival Curves at a Fixed Point in Time", Statistics in Medicine, vol. 26, No. 24, Oct. 30, 2007, pp. 4505-4519.
Klijn et al., "Antiprogestins a New Form of Endocrine Therapy for Human Breast Cancer", Cancer Research, vol. 49, No. 11, Jun. 1, 1989, pp. 2851-2856.
Kondo et al., "A Case of Ectopic Adrenocorticotropic Hormone-Producing Pancreatic Neuroendocrine Tumor with Multiple Liver Metastases", Endocrine Journal, vol. 57, No. 3, Apr. 2010, pp. 229-236.
Koochekpour, "Androgen Receptor Signaling and Mutations in Prostate Cancer", Asian Journal of Andrology, vol. 12, No. 5, Sep. 2010, pp. 639-657.
Kriaucionis et al., "The Nuclear DNA Base 5-Hydroxymethylcytosine is Present in Brain and Enriched in Purkinje Neurons", Science, vol. 324, No. 5929, May 15, 2009, 5 pages.
KUGITA, "Studies on the Syntheses of Hydrogenated Quinolines and Isoquinolines as Analgesics", Pharmaceutical Bulletin, vol. 4, No. 1, Feb. 1956, pp. 29-34.
Lante et al., "Subchronic Glucocorticoid Receptor Inhibition Rescues Early Episodic Memory and Synaptic Plasticity Deficits in a Mouse Model of Alzheimer's Disease", Neuropsychopharmacology, vol. 40, No. 7, Jun. 2015, pp. 1772-1781.
Li et al., "High Level of Androgen Receptor is Associated with Aggressive Clinicopathologic Features and Decreased Biochemical Recurrence-Free Survival in Prostate: Cancer Patients Treated with Radical Prostatectomy", The American Journal of Surgical Pathology, vol. 28, No. 7, Jul. 2004, pp. 928-934.
Li et al., "Systemic Overexpression of the 11β-HSD1 Promotes Endoplasmic Reticulum Stress in Multiple Tissues and the Development of Metabolic Syndrome in Mice", Molecular Medicine Reports, vol. 16, No. 5, Nov. 2017, pp. 7738-7744.
Loi et al., "Definition of Clinically Distinct Molecular Subtypes in Estrogen Receptor-Positive Breast Carcinomas Through Genomic Grade", Journal of Clinical Oncology, vol. 25, No. 10, Apr. 1, 2007, pp. 1239-1246.
Loi et al., "Predicting Prognosis Using Molecular Profiling in Estrogen Receptor-Positive Breast Cancer Treated With Tamoxifen", BMC Genomics, vol. 9, No. 239, May 22, 2008, pp. 1-12.
Lotan et al., "Up-Regulation of MKK4, MKK6 and MKK7 During Prostate Cancer Progression: An Important Role for SAPK Signalling in Prostatic Neoplasia", The Journal of Pathology, vol. 212, No. 4, Aug. 2007, pp. 386-394.
Lucci et al., "Modification of Ceramide Metabolism Increases Cancer Cell Sensitivity to Cytotoxics", International Journal of Oncology, vol. 15, No. 3, Sep. 1999, pp. 541-546.
Ma et al., "IL-21 Activates Both Innate and Adaptive Immunity to Generate Potent Antitumor Responses that Require Perforin but Are Independent of IFN-Gamma", Journal of Immunology, vol. 171, No. 2, Jul. 15, 2003, pp. 608-615.
MacPherson et al., "Glucocorticoids Worsen Excitotoxin-Induced Expression of Pro-Infammatory Cytokines in Hippocarnpal Cultures", Experimental Neurology, vol. 194, No. 2, Aug. 2005, pp. 376-383.
Magee et al., "Construction of Cis- and Trans-Decahydroisoquinolines Via Heterogeneous Catalytic Hydrogenation", The Journal of Organic Chemistry, American Chemical Society, vol. 64, No. 7, Mar. 16, 1999, pp. 2549-2554.
Mahmood et al., "3D-QSAR Comfa, Comsia Studies on Pyrazolo-Fused Azadecalins Derivatives as Selective Glucocorticoid Receptor Antagonists", Pharma Science Monitor, vol. 3, Issue 3, Jul. 2012, pp. 2027-2055.
Makarov et al., "Updated Nomogram to Predict Pathologic Stage of Prostate Cancer Given Prostate-Specific Antigen Level, Clinical Stage, and Biopsy Gleason Score (Partin Tables) Based on Cases from 2000 to 2005", Urology, vol. 69, No. 6, Jun. 2007, pp. 1095-1101.
Melhem et al., "Administration of Glucocorticoids to Ovarian Cancer Patients is Associated with Expression of the Anti-apoptotic Genes SGK1 and MKP1/DUSP1 in Ovarian Tissues", Clinical Cancer Research, vol. 15, No. 9, May 1, 2009, pp. 3196-3204.
Meyer et al., "The Selective Glucocorticoid Receptor Modulator Cort 113176 Reduces Neurodegeneration and Neuroinflammation in Wobbler Mice Spinal Cord", Neuroscience, vol. 384, 2018, pp. 384-396.

(56) References Cited

OTHER PUBLICATIONS

Meyer et al., "The Selective Glucocorticoid Receptor Modulator CORT108297 Restores Faulty Hippocampal Parameters in Wobbler and Corticosterone-Treated Mice", The Journal of Steroid Biochemistry and Molecular Biology, vol. 143, Sep. 2014, pp. 40-48.

Mikosz et al., "Glucocorticoid Receptor-Mediated Protection from Apoptosis is Associated with Induction of the Serine/Threonine Survival Kinase Gene, sgk-1", The Journal of Biological Chemistry, vol. 276, No. 20, May 18, 2001, pp. 16649-16654.

Miljkovic et al., "Methylprednisolone Inhibits IFN-Y and IL-17 Expression and Production by Cells Infiltrating Central Nervous System in Experimental Autoimmune Encephalomyelitis", Journal of Neuroinflammation, vol. 6, No. 37, Dec. 11, 2009, pp. 1-10.

Minn et al., "Genes that Mediate Breast Cancer Metastasis to Lung", Nature, vol. 436, No. 7050, Jul. 28, 2005, pp. 518-524.

Mohler et al., "Androgen and Glucocorticoid Receptors in the Stroma and Epithelium of Prostatic Hyperplasia and Carcinoma", Clinical Cancer Research, vol. 2, No. 5, May 1996, pp. 889-895.

Moller et al., "Impact of New Technologies for Cellular Screening Along the Drug Value Chain", Drug Discovery Today, vol. 15, No. 9-10, May 2010, pp. 384-390.

Montgomery et al., "Impact of Baseline Corticosteroids on Survival and Steroid Androgens in Metastatic Castration-Resistant Prostate Cancer: Exploratory Analysis from COU-AA-301", European Urology, vol. 67, No. 5, 2014, 8 pages.

Moran et al., "The Glucocorticoid Receptor Mediates a Survival Signal in Human Mammary Epithelial Cells", Cancer Research, vol. 60, No. 4, Feb. 15, 2000, pp. 867-872.

Moses et al., "The Growing Applications of Click Chemistry", Chemical Society Reviews, vol. 36, No. 8, May 2007, pp. 1249-1262.

Mottet et al., "EAU Guidelines on Prostate Cancer. Part II: Treatment of Advanced, Relapsing, and Castration-Resistant Prostate Cancer", European Urology, vol. 59, Jan. 2011, pp. 572-583.

Munhoz et al., "Chronic Unpredictable Stress Exacerbates Lipopolysaccharide-Induced Activation of Nuclear Factor-kappaB in the Frontal Cortex and Hippocampus Via Glucocorticoid Secretion", The Journal of Neuroscience, vol. 26, No. 14, Apr. 2006, pp. 3813-3820.

Munster et al., "A Phase 1/2 Study of Relacorilant + Nab-Paclitaxel (Nab-Pac) in Patients (Pts) with Solid Tumors: The Dose-Finding Phase", Journal of Clinical Oncology, vol. 36, No. 15, May 20, 2018, 4 pages.

Munster et al., "A Phase 1/2 Study of Relacorilant + Nab-Paclitaxel in Patients with Solid Tumors: The Dose-Finding Phase", American Association for Cancer Research, 2018, 1 page.

Niemeier et al., "Androgen Receptor in Breast Cancer: Expression in Estrogen Receptor-Positive Tumors and in Estrogen Receptor-Negative Tumors with Apocrine Differentiation", Modern Pathology, vol. 23, No. 2, Feb. 2010, pp. 205-212.

Norman et al., "Functional Glucocorticoid Receptor Modulates Pancreatic Carcinoma Growth Through an Autocrine Loop", Journal of Surgical Research, vol. 57, No. 1, Jul. 1994, pp. 33-38.

Novotny et al., "Cancer Therapy: New Targets for Chemotherapy", Hematology, vol. 8, No. 3, Jun. 2003, pp. 129-137.

Ocana et al., "Preclinical Development of Molecular-Targeted Agents for Cancer", Nature Reviews Clinical Oncology Review, vol. 8, No. 4, Apr. 2011, pp. 200-209.

Ohlmann et al., "Novel Options for the Treatment of Castration-Resistant Prostate Cancer", World Journal of Urology, vol. 30, No. 4, Aug. 2012, pp. 495-503.

Orayj et al., "Patterns and Determinants of Prescribing for Parkinson's Disease: A Systematic Literature Review", Parkinson's Disease, Review Article ID 9237181, vol. 2019, Nov. 2019, pp. 1-40.

Pan et al., "Activation of the Glucocorticoid Receptor is Associated with Poor Prognosis in Estrogen Receptor-Negative Breast Cancer", Cancer Research, vol. 71, No. 20, Oct. 15, 2011, pp. 6360-6370.

Pan et al., "Identification of Glucocorticoid Receptor (GR) Signatures in Primary Human Breast Cancer: Association with Relapse-Free Survival Time", Poster Presented by S.D. Conzen as a Short Talk, presented at Nuclear Receptors: Signaling, Gene Regulation and Cancer, Keystone Symposia on Molecular and Cellular Biology, Keystone Resort, Keystone, Colorado, Mar. 25, 2010, 1 page.

Pang et al., "Dexamethasone Decreases Xenograft Response to Paclitaxel Through Inhibition of Tumor Cell Apoptosis", Cancer Biology & Therapy, vol. 5, No. 8, Aug. 2006, pp. 933-940.

Panigrahi et al., "Gelucire: A Versatile Polymer for Modified Release Drug Delivery System", Future Journal of Pharmaceutical Sciences, vol. 4, No. 1, Apr. 2018, pp. 102-108.

Patacchioli et al., "Adrenal Dysregulation in Amyotrophic Lateral Sclerosis", Journal of Endocrinological Investigation, vol. 26, No. 12, Dec. 2003, pp. 1-6.

PCT/US2013/042732, "International Preliminary Report on Patentability", Dec. 4, 2014, 6 pages.

PCT/US2013/042732, "International Search Report and Written Opinion", Nov. 13, 2013, 8 pages.

Peeters et al., "Differential Effects of the New Glucocorticoid Receptor Antagonist ORG 34517 and RU486 (Mifepristone) on Glucocorticoid Receptor Nuclear Translocation in the AtT20 Cell Line", Annals of the New York Academy of Sciences, vol. 1148, No. 1, Dec. 2008, pp. 536-541.

Perini et al., "Effects of Carbamazepine on Pituitary-Adrenal Function in Healthy Volunteers", The Journal of Clinical Endocrinology and Metabolism, vol. 74, No. 2, Feb. 1, 1992, pp. 406-412.

Petrov et al., "ALS Clinical Trials Review: 20 Years of Failure. Are we Any Closer to Registering a New Treatment?", Frontiers in Aging Neuroscience, vol. 9, No. 68, Mar. 2017, pp. 1-11.

Petrylak et al., "Evaluation of Prostate-Specific Antigen Declines for Surrogacy in Patients Treated on SWOG 99-16", Journal of the National Cancer Institute, vol. 98, No. 8, Apr. 19, 2006, pp. 516-521.

Pike et al., "Estrogens, Progestogens, Normal Breast Cell Proliferation, and Breast Cancer Risk", Epidemiologic Reviews, vol. 15, No. 1, Jan. 1, 1993, pp. 17-30.

Pomara et al., "Mifepristone (RU 486) for Alzheimer's Disease", Neurology, vol. 58, May 2002, pp. 1436-1437.

Pound et al., "Natural History of Progression after PSA Elevation Following Radical Prostatectomy", JAMA, vol. 281, No. 17, May 5, 1999, pp. 1591-1597.

Rakotomamonjy et al., "Brain-Derived Neurotrophic Factor is Required for the Neuroprotective Effect of Mifepristone on Immature Purkinje Cells in Cerebellar Slice Culture", International Journal of Molecular Sciences., vol. 20, No. 2, Jan. 12, 2019, pp. 1-9.

Ramsay, "Immune Checkpoint Blockade Immunotherapy to Activate Anti-Tumour T-Cell Immunity", British Journal of Haematology, vol. 162, No. 3, Aug. 2013, pp. 313-325.

Rauhala et al., "Dual-Specificity Phosphatase 1 and Serum/Glucocorticoid-Regulated Kinase are Downregulated in Prostate Cancer", International Journal of Cancer, vol. 117, No. 5, Dec. 10, 2005, pp. 738-745.

Reagan-Shaw et al., "Dose Translation from Animal to Human Studies Revisited", The Faseb Journal, vol. 22, Mar. 2007, pp. 659-661.

Rehn et al., "Antiinflammatory Action of Glucocorticoids—New Mechanisms for Old Drugs", The New England Journal of Medicine, vol. 353, No. 16, Oct. 20, 2005, pp. 1711-1723.

Ring et al., "Mechanisms of Tamoxifen Resistance", Endocrine-Related Cancer, vol. 11, No. 4, Dec. 2004, pp. 643-658.

Robinson et al., "Octahydrophenanthrene-2,7-diol Analogues as Dissociated Glucocorticoid Receptor Agonists: Discovery and Lead Exploration", Journal of Medicinal Chemistry, vol. 52, No. 6, Mar. 26, 2009, pp. 1731-1743.

Roozendaal et al., "The Cortisol Awakening Response in Amyotrophic Lateral Sclerosis is Blunted and Correlates with Clinical Status and Depressive Mood", Psychoneuroendocrinology, vol. 37, Jan. 2012, pp. 20-26.

Rosner et al., "Higher Tumor to Benign Ratio of the Androgen Receptor mRNA Expression Associates with Prostate Cancer Progression after Radical Prostatectomy", Urology, vol. 70, No. 6, Dec. 2007, pp. 1225-1229.

Sahoo et al., "Coordinate Expression of the PI3-Kinase Downstream Effectors Serum and Glucocorticoid-Induced Kinase (SGK-1) and Akt-1 in Human Breast Cancer", European Journal of Cancer, vol. 41, No. 17, Nov. 2005, pp. 2754-2759.

(56) References Cited

OTHER PUBLICATIONS

Sahu et al., "FoxA1 Specifies Unique Androgen and Glucocorticoid Receptor Binding Events in Prostate Cancer Cells", Cancer Research, vol. 73, No. 5, Mar. 2013, pp. 1570-1580.
Sausville et al., "Contributions of Human Tumor Xenografts to Anticancer Drug Development", Cancer Research, vol. 66, No. 7, Apr. 2006, pp. 3351-3354.
Schenone et al., "Target Identification and Mechanism of Action in Chemical Biology and Drug Discovery", Nature Chemical Biology, vol. 9, No. 4, Mar. 18, 2013, pp. 232-240.
Scher et al., "Antitumour Activity of MDV3100 in Castration-Resistant Prostate Cancer: A Phase 1-2 Study", Lancet, vol. 375, No. 9724, Apr. 24, 2010, pp. 1437-1446.
Scher et al., "Biology of Progressive, Castration-Resistant Prostate Cancer: Directed Therapies Targeting the Androgen-Receptor Signaling Axis", Journal of Clinical Oncology, vol. 23, No. 32, Nov. 10, 2005, pp. 8253-8261.
Scher et al., "End Points and Outcomes in Castration-Resistant Prostate Cancer: From Clinical Trials to Clinical Practice", Journal of Clinical Oncology, vol. 29, No. 27, Sep. 20, 2011, pp. 3695-3704.
Schlossmacher et al., "Glucocorticoid Receptor-Mediated Apoptosis: Mechanisms of Resistance In Cancer Cells", Journal of Endocrinology, vol. 211, No. 1, Oct. 2011, pp. 17-25.
Schultz et al., "Heteroatom Directed Photoarylation. Synthetic Potential of the Heteroatom Oxygen", Journal of the American Chemical Society, vol. 100, No. 7, Mar. 29, 1978, pp. 2150-2162.
Schultz et al., "Studies Directed at a Synthesis of the Morphine Alkaloids. A Photochemical Approach", The Journal of Organic Chemistry, vol. 50, No. 2, Jan. 1985, pp. 217-231.
Segovia-Mendoza et al., "Antihormonal Agents as a Strategy to Improve the Effect of Chemo-Radiation in Cervical Cancer: In Vitro and in Vivo Study", BMC Cancer, vol. 15, No. 21, Jan. 27, 2015, pp. 1-11.
Seruga et al., "Drug Resistance in Metastatic Castration-Resistant Prostate Cancer", Nature Reviews Clinical Oncology, vol. 8, No. 1, Jan. 2011, pp. 12-23.
Shanmugam et al., "Serum/Glucocorticoid-Induced Protein Kinase-1 Facilitates Androgen Receptor-Dependent Cell Survival", Cell Death Differ, vol. 14, No. 12, Oct. 12, 2007, pp. 2085-2094.
Sharma et al., "Cell Line-Based Platforms to Evaluate the Therapeutic Efficacy of Candidate Anticancer Agents", Nature Reviews Cancer, vol. 10, No. 4, Apr. 2010, pp. 241-253.
Sherk et al., "Development of a Small Molecule Serum and Glucocorticoid-Regulated Kinase 1 Antagonist and its Evaluation as a Prostate Cancer Therapeutic", Cancer Research, vol. 68, No. 18, Sep. 15, 2008, pp. 7475-7483.
Sims et al., "The Removal of Multiplicative, Systematic Bias Allows Integration of Breast Cancer Gene Expression Datasets—Improving Meta-Analysis and Prediction of Prognosis", BMC Medical Genomics, vol. 1, No. 42, Sep. 21, 2008, pp. 1-14.
Skor et al., "Glucocorticoid Receptor Antagonism as a Novel Therapy for Triple-Negative Breast Cancer", Clinical Cancer Research, vol. 19, No. 22, Nov. 15, 2013, pp. 6163-6172.
Smith et al., "Expression of Glucocorticoid and Progesterone Nuclear Receptor Genes in Archival Breast Cancer Tissue", Breast Cancer Research, vol. 5, No. 1, 2003, pp. R9-R12.
Smith et al., "Progesterone, Glucocorticoid, but Not Estrogen Receptor mRNA is Altered in Breast Cancer Stroma", Cancer Letters, vol. 255, No. 1, Sep. 18, 2007, pp. 77-84.
Song et al., "Dihydrotestosterone Enhances Castration-Resistant Prostate Cancer Cell Proliferation through STAT5 Activation via Glucocorticoid Receptor Pathway", The Prostate, vol. 74, No. 12, Sep. 2014, pp. 1240-1248.
Sorlie et al., "Gene Expression Patterns of Breast Carcinomas Distinguish Tumor Subclasses with Clinical Implications", Proceedings of the National Academy of Sciences of the United States of America, vol. 98, No. 19, Sep. 11, 2001, pp. 10869-10874.

Sotiriou et al., "Gene Expression Profiling in Breast Cancer: Understanding the Molecular Basis of Histologic Grade to Improve Prognosis", Journal of the National Cancer Institute, vol. 98, No. 4, Feb. 15, 2006, pp. 262-272.
Spataro et al., "Plasma Cortisol Level in Amyotrophic Lateral Sclerosis", Journal of the Neurological Sciences, vol. 358, Nov. 2015, pp. 282-286.
Spitz et al., "Mifepristone (RU 486)—A Modulator of Progestin and Glucocorticoid Action", The New England Journal of Medicine, Massachusetts Medical Society, vol. 329, No. 6, Aug. 5, 1993, pp. 404-412.
Srinivas et al., "Phase II Study Evaluating Oral Triamcinolone in Patients with Androgen-Independent Prostate Cancer", Adult Urology, vol. 67, No. 5, May 1, 2006, pp. 1001-1006.
Srinivas et al., "Proteomics for Cancer Biomarker Discovery", Clinical Chemistry, vol. 48, No. 8, Aug. 2002, pp. 1160-1169.
Stephenson et al., "Preoperative Nomogram Predicting the 10-Year Probability of Prostate Cancer Recurrence After Radical Prostatectomy", Journal of the National Cancer Institute, vol. 98, No. 10, May 17, 2006, pp. 715-717.
Sterbis et al., "Higher Expression of the Androgen-Regulated Gene PSA/HK3 mRNA in Prostate Cancer Tissues Predicts Biochemical Recurrence-Free Survival", Clinical Cancer Research, vol. 14, No. 3, Feb. 2008, pp. 758-763.
Stringer-Reasor et al., "Glucocorticoid Receptor Activation Inhibits Chemotherapy-Induced Cell Death in High-Grade Serous Ovarian Carcinoma", Gynecologic Oncology, vol. 138, No. 3, Sep. 2015, pp. 656-662.
Sui et al., "Estrogen Receptor α Mediates Breast Cancer Cell Resistance to Paclitaxel Through Inhibition of Apoptotic Cell Death", Cancer Research, vol. 67, No. 11, Jun. 1, 2007, pp. 5337-5344.
Sun et al., "Castration Resistance in Human Prostate Cancer is Conferred by a Frequently Occurring Androgen Receptor Splice Variant", Journal of Clinical Investigation, vol. 120, No. 8, Aug. 2, 2010, pp. 2715-2730.
Sundahl et al., "Selective Glucocorticoid Receptor-Activating Adjuvant Therapy in Cancer Treatments". Oncoscience, vol. 3, No. 7-8, Jul. 2016, pp. 188-202.
Szmulewitz et al., "Serum/Glucocorticoid-Regulated Kinase 1 Expression in Primary Human Prostate Cancers", Prostate, vol. 72, No. 2, Feb. 1, 2012, pp. 157-164.
Tannock et al., "Docetaxel Plus Prednisone or Mitoxantrone Plus Prednisone for Advanced Prostate Cancer", The New England Journal of Medicine, vol. 351, No. 15, Oct. 7, 2004, pp. 1502-1512.
Taplin et al., "A Phase II Study of Mifepristone (RU-486) in Castration-Resistant Prostate Cancer, with a Correlative Assessment of Androgen-Related Hormones", BJU International, vol. 101, No. 9, May 1, 2008, pp. 1084-1089.
Tessier et al., "Serum and Glucocorticoid-Regulated Protein Kinases: Variations on a Theme", Journal of Cellular Biochemistry, vol. 98, No. 6, Aug. 15, 2006, pp. 1391-1407.
Tokuda et al., "Prednisolone (30-60 Mg/Day) for Diseases Other than AD Decreases Amyloid B-peptides in CSF", Neurology, vol. 58, No. 9, May 14, 2002, 1 page.
Touat et al., "Successful Treatment of Multiple Intracranial Meningiomas with the Antiprogesterone Receptor Agent Mifepristone (RU486)", Acta Neurochirurgica, vol. 156, No. 10, Oct. 2014, pp. 1831-1835.
Twiddy et al., "Cholesterol as a Potential Target for Castration-Resistant Prostate Cancer", Pharmaceutical Research, vol. 28, No. 3, Mar. 2011, pp. 423-437.
Uchida et al., "An Efficient Access to the Optically Active Manzamine Tetracyclic Ring System", Tetrahedron Letters, vol. 40, Issue 1, Jan. 1, 1999, pp. 113-116.
Venkatesh et al., "Role of the Development Scientist in Compound Lead Selection and Optimization", Journal of Pharmaceutical Sciences, vol. 89, No. 2, Feb. 2000, pp. 145-154.
Von Hoff et al., "Increased Survival in Pancreatic Cancer with Nab-Paclitaxel Plus Gemcitabine", The New England Journal of Medicine, vol. 369, No. 18, Oct. 31, 2013, pp. 1691-1703.
Wang et al., "Gene-Expression Profiles to Predict Distant Metastasis of Lymph-Node-Negative Primary Breast Cancer", The Lancet, vol. 365, No. 9460, Feb. 19, 2005, pp. 671-679.

(56) References Cited

OTHER PUBLICATIONS

Ward et al., "Rising Prostate-Specific Antigen after Primary Prostate Cancer Therapy", Nature Clinical Practice Urology, vol. 2, No. 4, Apr. 1, 2005, pp. 174-182.

West et al., "Abstract PD3-02: Second-Generation Selective Glucocorticoid Receptor Modulators in Triple-Negative Breast Cancer", Cancer Research, Thirty-Eighth Annual CTRC-AACR, vol. 76, No. 4, Feb. 2016, pp. 1-4.

Wright et al., "Differences in Prostate Cancer Outcomes Between Cases With Gleason 4+3 and Gleason 3+4 Tumors in a Population-Based Cohort", The Journal of Urology, vol. 182, No. 6, Dec. 2009, pp. 2702-2707.

Wu et al., "Glucocorticoid Receptor Activation Signals Through Forkhead Transcription Factor 3a in Breast Cancer Cells", Molecular Endocrinology, vol. 20, No. 10, Oct. 1, 2006, pp. 2304-2314.

Wu et al., "Microarray Analysis Reveals Glucocorticoid-Regulated Survival Genes that are Associated with Inhibition of Apoptosis in Breast Epithelial Cells", Cancer Research, vol. 64, No. 5, Mar. 1, 2004, pp. 1757-1764.

Wu et al., "Prevalent Expression of the Immunostimulatory MHC Class I Chain-Related Molecule Is Counteracted by Shedding in Prostate Cancer", Journal of Clinical Investigation, vol. 114, No. 4, Aug. 16, 2004, pp. 560-568.

Xie et al., "The Expression of Glucocorticoid Receptor is Negatively Regulated by Active Androgen Receptor Signaling in Prostate Tumors", International Journal of Cancer, vol. 136, 2015, pp. E27-E38.

Yan et al., "Relationship between Glucocorticoid Receptor Signal Pathway and Androgen-Independent Prostate Cancer", Urologia Internationalis, vol. 81, Issue 2, 2008, pp. 228-233.

Yemelyanov et al., "Differential Targeting of Androgen and Glucocorticoid Receptors Induces ER Stress and Apoptosis in Prostate Cancer Cells", Cell Cycle, vol. 11, No. 2, Jan. 15, 2012, pp. 395-406.

Yemelyanov et al., "Tumor Suppressor Activity of Glucocorticoid Receptor in the Prostate", Oncogene, vol. 26, No. 13, Mar. 22, 2007, pp. 1885-1896.

Yu et al., "Systems Pharmacology of Mifepristone (RU486) Reveals its 47 Hub Targets and Network: Comprehensive Analysis and Pharmacological Focus on FAK-Src-Paxillin complex", Scientific Reports, vol. 5, No. 7830, Jan. 19, 2015, pp. 1-10.

Zegarra-Moro et al., "Disruption of Androgen Receptor Function Inhibits Proliferation of Androgen-Refractory Prostate Cancer Cells", Cancer Research, vol. 62, No. 4, Feb. 15, 2002, pp. 1008-1013.

Zhang et al., "Corticosteroid Co-Treatment Induces Resistance to Chemotherapy in Surgical Resections, Xenografts and Established Cell Lines of Pancreatic Cancer", BMC Cancer, vol. 6, No. 61, Mar. 15, 2006, pp. 1-14.

Zhao et al., "Glucocorticoid Receptor in Prostate Epithelia is not required for Corticosteroid-Induced Epithelial Hyperproliferation in the Mouse Prostate", The Prostate, vol. 74, 2014, pp. 1068-1078.

Zou et al., "Androgen-Induced Coactivator ANCCA Mediates Specific Androgen Receptor Signaling in Prostate Cancer", Cancer Research, vol. 69, No. 8, Apr. 2009, pp. 3339-3346.

Hunt et al., "Preclinical Efficacy of the Selective GR antagonist, CORT125134", American Association for Cancer Research, 2017, 3 pages.

International Patent Application No. PCT/US2023/078018, "International Search Report and the Written Opinion", Feb. 23, 2024, 13 pages.

Wymer et al., "Pharmacokinetics, Bioavailability, and Swallowing Safety with Riluzole Oral Film", Clinical Pharmacology in Drug Development, vol. 12, No. 1, Sep. 27, 2022, pp. 57-64.

U.S. Appl. No. 18/121,694, "Non-Final Office Action", Sep. 6, 2024, 13 pages.

Kroon et al., "The Development of Novel Glucocorticoid Receptor Antagonists: From Rational Chemical Design to Therapeutic Efficacy in Metabolic Disease Models", Pharmacological Research, vol. 168, No. 105588, Jun. 2021, 13 pages.

International Patent Applicaiton No. PCT/US2023/078018, "International Preliminary Report on Patentability", May 8, 2025, 8 pages.

Pouton, C., "Formulation of poorly water-soluble drugs for oral administration: Physiochemical and physiological issues and the lipid formulation classification system", European Journal of Pharmaceutical Sciences 29, 2006, pp. 278-287.

* cited by examiner

Fed versus Fasted Comparison

| Dose (mg) | Fed state | AUC$_{last}$ (h*ng/mL) | AUC$_{inf}$ (h*ng/mL) | C$_{max}$ (ng/mL) | Fed vs Fasted Ratio of AUC$_{last}$ | Ratio of AUC$_{inf}$ | Ratio of C$_{max}$ |
|---|---|---|---|---|---|---|---|
| 150 | Fasted | 385.5 | 430.8 | 114.3 | 1.32 | 1.31 | 1.41 |
|  | Fed (Standard meal) | 509.7 | 566.3 | 161 |  |  |  |
| 300 | Fasted | 1300.7 | 1577.7 | 253.9 | 1.33 | 1.29 | 1.74 |
|  | Fed (Standard meal) | 1735.9 | 2033.6 | 441.9 |  |  |  |

FIG. 1B

Dazucorilant Multiple Dose Pharmacokinetics

| Dose | Day | $AUC_{0\text{-}tau}$ (ng·h/mL) [a] | $C_{max}$ (ng/mL) |
|---|---|---|---|
| 150 mg QD fed | 1 | 433 | 109 |
|  | 7 | 733 | 174 |
|  | 14 | 756 | 157 |
| 300 mg QD fed | 1 | 1632 | 419 |
|  | 7 | 3087 | 720 |
|  | 14 | 3122 | 652 |

$AUC_{0\text{-}24}$ is reported for Day 1.

FIG. 2B

TREATMENTS FOR AMYOTROPHIC LATERAL SCLEROSIS USING DAZUCORILANT

CROSS-REFERENCE TO RELATED APPLICATIONS

This application claims priority to, and the benefit of, U.S. Provisional Patent Application Ser. No. 63/420,409, filed on Oct. 28, 2022; U.S. Provisional Patent Application Ser. No. 63/427,305, filed on Nov. 22, 2022; U.S. Provisional Patent Application Ser. No. 63/453,989, filed on Mar. 22, 2023; and U.S. Provisional Patent Application Ser. No. 63/525,044, filed on Jul. 5, 2023, the entire contents of all which applications are hereby incorporated by reference in their entireties.

BACKGROUND

Amyotrophic lateral sclerosis (ALS) is a devastating, ultimately fatal, neurodegenerative disease for which there are few treatment options. Survival time following disease onset is only about 3 to 5 years, with most patients succumbing to respiratory failure. Characteristics of ALS include, for example, motoneuron loss in the spinal cord, brainstem, and cerebral cortex, leading to muscle weakness and eventual paralysis. Initial symptoms vary, with some patients first experiencing weakness in the upper limbs, while others first experience weakness of lower limbs. About one third of patients with ALS may have bulbar onset, experiencing problems with speech (dysarthria) or with swallowing (dysphagia) early in the course of the disease.

Many ideas have been put forward attempting to identify a root cause of ALS, including neuronal damage due to excess glutamate ("excitotoxicity"); neuronal damage due to excess levels of oxygen free radicals (e.g., disorders related to superoxide dismutase (SOD); protein misfolding; inflammation; abnormal axonal transport; mitochondrial dysfunction; and endoplasmic reticulum dysfunction (see, e.g., Xu et al., Translational Neurodegeneration 2021; 10:29). Hormonal abnormalities may be a factor: high levels of estrogen and progesterone may be protective, or may slow disease progression (Pape et al., Rev Neurol (Paris). 2020 May; 176(5): 301-315). Dysregulation of cortisol levels have been reported in patients with ALS (Patacchioli et al., J Endocrinol Invest. 2003; 26: RC23-RC25; Spataro et al., J Neurol Sci. 2015; 358 (1-2): 282-286).

Treatment for ALS may include administration of riluzole (which inhibits glutamatergic neurotransmission) or edaravone (an antioxidant) in the hope of slowing ALS progression. Other drugs used to treat patients suffering from ALS include Tiglutik® (thickened riluzole); Exservan™ (riluzole oral film); RELYVRIO™ (AMX-0035), which is a combination of two drugs, sodium phenylbutyrate and taurursodiol; and Nuedexta® (dextromethorphan HBr and quinidine sulfate), for the treatment of pseudobulbar affect (PBA). Qalsody™ (tofersen) has been approved by the FDA to treat patients with ALS associated with a mutation in the superoxide dismutase 1 (SOD1) gene. However, all patient treatments include palliative care, since the disease progresses despite administration of approved drug treatments.

Accordingly, in order to provide improved patient care and to slow disease progression improved methods and compositions for use in treating patients suffering from ALS are needed.

SUMMARY

Disclosed herein are novel methods for treating amyotrophic lateral sclerosis (ALS). The methods comprise administering to the subject an effective amount of a heteroaryl ketone fused azadecalin compound. Preferably, the heteroaryl ketone fused azadecalin compound is a compound that modulates glucocorticoid receptors (GRs). A compound that modulates a GR is termed a GR modulator (GRM); a GRM compound which has little or no modulatory effect on other steroid hormone receptors (such as, e.g., a progesterone receptor, an aldosterone receptor, or an androgen receptor) is termed a selective GRM (SGRM). In embodiments, the methods for treating ALS disclosed herein comprise administering to the subject an effective amount of the SGRM heteroaryl ketone fused azadecalin compound (R)-(1-(4-fluorophenyl)-6-((4-(trifluoromethyl)phenyl) sulfonyl)-4, 4a, 5,6,7,8-hexahydro-1-H-pyrazolo[3,4-g]isoquinolin-4a-yl) (pyridin-2-yl)methanone, also termed "dazucorilant" or "CORT133176", which has the structure:

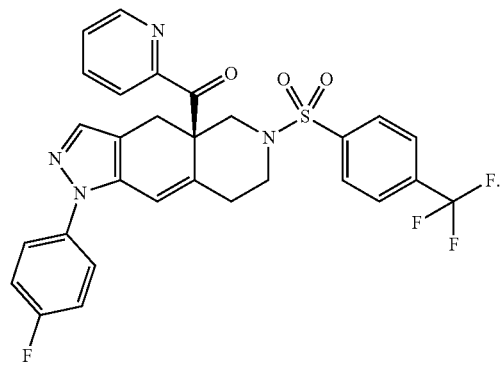 [SMILES: O=C(c1ccccn1)[C@]12Cc3cnn(-c4ccc(F)cc4)c3C=C1CCN(S(=O)(=O)c1ccc(C(F)(F)F)cc1)C2]

Dazucorilant is disclosed in Example 1 of U.S. Pat. No. 8,859,774 (the entire contents of which patent is hereby incorporated by reference in its entirety).

In embodiments, the GRM (e.g., a SGRM) is orally administered. In embodiments, the GRM or SGRM may be administered by injection, infusion, transdermal application, or by other means or routes of administration. In embodiments, the GRM (e.g., dazucorilant) may be administered with food, or with water, or with both food and water. In other embodiments, the GRM (e.g., dazucorilant) may be administered in the absence of food.

In embodiments, the effective amount of the GRM (e.g., a SGRM, such as dazucorilant) is a daily dose of between 50 and 500 milligrams per day (mg/day); e.g., in embodiments, the daily dose of the GRM (e.g., a SGRM, such as dazucorilant) is 50, 75, 100, 125, 150, 200, 225, 250, 300, 350, 375, 400, 450, 500, 525, or 600 mg/day. Typically, administration of the GRM (e.g., a SGRM, such as dazucorilant) is once-daily administration; however, in embodiments, administration may be twice daily, or three times daily, or may be every other day, or every three days, or every four days, or at other intervals as necessary or convenient. The GRM (e.g., a SGRM, such as dazucorilant) may be administrated to the patient for as long as necessary; for example, administration of the GRM (e.g., a SGRM, such as dazucorilant) may continue for weeks, months, or years as needed.

The present methods provide improved methods of treating ALS.

BRIEF DESCRIPTION OF THE DRAWINGS

FIG. 1B shows pharmacokinetic parameters of dazucorilant administration to healthy human volunteers. Greater dazucorilant exposure was observed when dazucorilant was administered to fed subjects as compared to the dazucorilant exposure observed in fasted subjects.

FIG. 2B shows pharmacokinetic parameters of dazucorilant administration to healthy human volunteers who were administered dazucorilant daily at the indicated dosages for successive 14 days. Greater than dose-proportional increase in dazucorilant exposures was observed.

DETAILED DESCRIPTION

Introduction

Figure 1A:
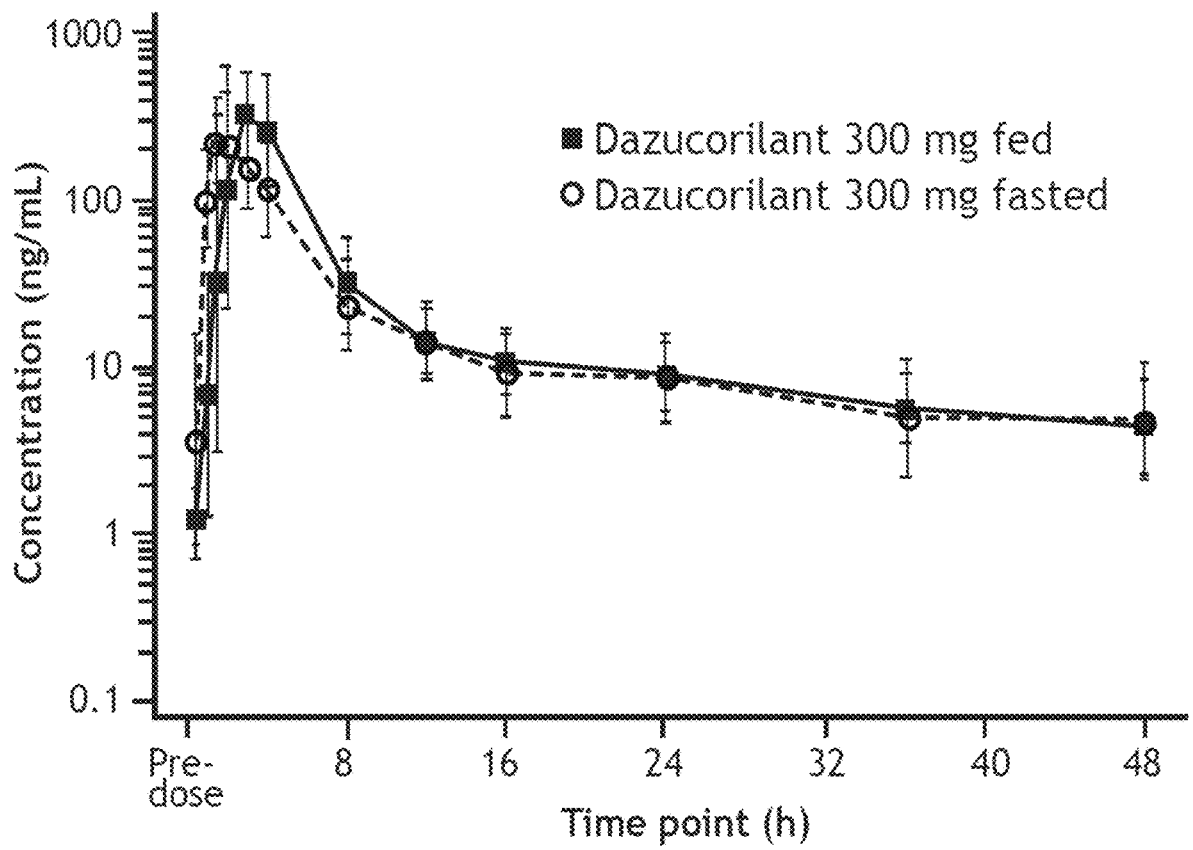
FIG. 1A shows plasma concentrations of dazucorilant 300 mg with and without food in the PK study of dazucorilant administration to healthy human volunteers. Greater dazucorilant exposure was observed when dazucorilant was administered to fed subjects as compared to the dazucorilant exposure observed in fasted subjects.

The methods disclosed herein can be used to treat a patient suffering from ALS by administering an effective amount of a heteroaryl ketone fused azadecalin glucocorticoid receptor modulator (GRM), preferably a heteroaryl ketone fused azadecalin selective glucocorticoid receptor modulator (SGRM) effective to treat ALS. In preferred embodiments, the SGRM is dazucorilant (also termed CORT113176): (R)-(1-(4-fluorophenyl)-6-((4-(trifluoromethyl)phenyl) sulfonyl)-4, 4a, 5,6,7,8-hexahydro-1-H-pyrazolo[3,4-g]isoquinolin-4a-yl) (pyridin-2-yl)methanone, which has the structure:

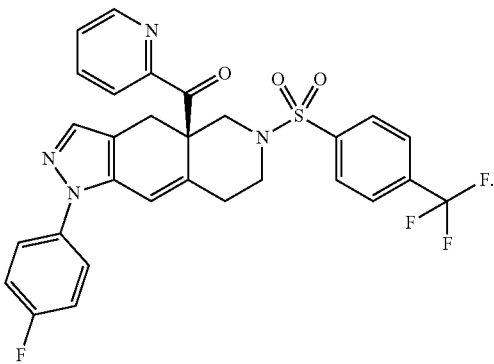 [SMILES: O=C(c1ccccn1)[C@]12Cc3cnn(-c4ccc(F)cc4)c3C=C1CCN(S(=O)(=O)c1ccc(C(F)(F)F)cc1)C2]

In embodiments, the methods disclosed herein can be used to treat a patient suffering from ALS by administering an effective amount of a heteroaryl ketone fused azadecalin GRM or SGRM, along with another ALS treatment, effective to treat ALS. In embodiments, the other ALS treatment may include, e.g., administration of riluzole or edaravone, or other drug. In preferred embodiments, the patient suffering from ALS is administered dazucorilant along with riluzole or edaravone or other drug (e.g., Tiglutik®; Exservan™; RELYVRIO™; or Nuedexta® or other drug used to treat ALS).

In embodiments of the methods disclosed herein, an effective amount of a heteroaryl ketone fused azadecalin GRM or SGRM (e.g., dazucorilant) is administered to a patient suffering from ALS effective to treat the patient. In embodiments, an effective amount for the treatment of ALS by administration of a GRM or SGRM such as dazucorilant may be, e.g., 10 milligrams per day (mg/day), or 20 mg/day, or 25 mg/day, or 30 mg/day, or 50 mg/day, or 75 mg/day, or 100 mg/day, or 125 mg/day, or 150 mg/day, or 175 mg/day, or 200 mg/day, or 225 mg/day, or 250 mg/day, or 300 mg/day, or 350 mg/day, or 375 mg/day, or 400 mg/day, or 450 mg/day, or 500 mg/day, or 525 mg/day, or 600 mg/day, or 700 mg/day, or 800 mg/day, or 900 mg/day, or 1000 mg/day, or other amount, effective to treat ALS. In embodiments, the heteroaryl ketone fused azadecalin GRM or SGRM (e.g., dazucorilant) may be administered orally, and may be administered without food, or may be administered along with food, or along with water, or along with both food and water. In embodiments, the heteroaryl ketone fused azadecalin GRM or SGRM (e.g., dazucorilant) may be administered once per day (QD), or may be administered twice, or thrice, or other multiple times per day. Administration of the heteroaryl ketone fused azadecalin GRM or SGRM (e.g., dazucorilant) may continue for weeks, months, or years as needed; e.g., dazucorilant administration may continue for at least 2, 5, 10, 36, 52, 104, 156, or 208 weeks, or longer.

An effective amount of dazucorilant, or other GRM or SGRM, may be administered to the patient orally, e.g., by mouth, in a capsule, pill, tablet, fluid, emulsion, or other composition suitable for oral administration. Experiments show that in healthy volunteers orally administered dazucorilant, distribution of dazucorilant is observed in the cerebrospinal fluid, indicative of dazucorilant passing the blood-brain barrier in humans. Administration of dazucorilant on multiple days leads to increased plasma levels of dazucorilant as compared to the level obtained by the same dose of dazucorilant administered on only one day; plasma levels of dazucorilant achieve steady state in approximately 7 days.

In embodiments, administration of a GRM or SGRM, such as dazucorilant, may be aided, or may be effected, by a straw, a feeding tube, an oral syringe, or other appliance or device which helps the patient ingest the oral treatment. Thus, in embodiments, administration of a GRM or SGRM, such as dazucorilant, may be via a feeding tube, or other enteral administration means (e.g., nasogastric, orogastric, duodenal, or gastronomy tube) in place of, or in addition to, administration of a capsule, or pill, or solution to the patient.

Definitions

As used herein, "about" refers to plus or minus 5% of the specified value unless otherwise indicated.

As used herein, the term "patient" refers to a human that is or will be receiving, or has received, medical care for a disease or condition, such as, e.g., ALS.

As used herein, the terms "amyotrophic lateral sclerosis" and "ALS" refer to the neurodegenerative disease of that name, which is characterized by progressive degeneration of motor neurons in both the brain and the spinal cord leading to progressive muscle weakness, relentless disability and death; death typically occurs within 3-5 years from symptom onset. Only a small percentage of patients with ALS survive more than 10 years, 50% of patients die within 30 months of symptom onset and only 20% of patients survive between 5 and 10 years (Riva et al. 2016 J. Neurol. 263:1241-1254). Respiratory failure is the most common cause of mortality in patients with ALS (Riva et al. 2016 J. Neurol. 263:1241-1254; Turner et al. 2013 Lancet Neurol. 12:310-322).

As used herein, the ENCALS Risk Profile refers to the score for patients with ALS that accounts for 7 patient characteristics in a single score (which is a weighted average of patient characteristics) that serves as an estimate of the patient's overall prognosis (see, e.g., Westeneng et al., *Lancet Neurol.* 2018; 17(5): 423-433; van Eijk et al., *Neurology.* 2019; 92 (5): e451-e460; van Eijk et al., *Neurology.* 2021; 97(11): 528-536). ("ENCALS" is an acronym for the European Network for the Cure of ALS.) The ENCALS Risk Profile is a multivariate risk-profile-based inclusion and exclusion criteria calculator developed by combining patients' prognostic characteristics. The ENCALS Risk Profile is intended to provide the ability to assess patient eligibility for a larger proportion of the patient population and maximize the generalizability of the trial results. It is useful for characterizing and identifying patients that may be suitable for inclusion in a study.

The E1 Escorial Definite classification is defined as the clinical presence of upper and lower motor neuron signs in three or more regions at the day of screening. E1 Escorial Definite Classification uses E1 Escorial criteria, and provides a diagnosis of ALS based on signs of degeneration of motor neurons by clinical examination or specialized testing. The ENCALS Risk Profile considers a patient to be "Definite ALS" only when a patient has at least three affected regions, irrespective of the presence of a known pathogenic mutation.

ALSFRS-R is a qualified health-care provider questionnaire used to estimate the patient's degree of functional impairment.

As used herein, the term "effective amount" or "therapeutic amount" refers to an amount of a pharmacological agent effective to treat, eliminate, or mitigate at least one symptom of the disease being treated. In some cases, "therapeutically effective amount" or "effective amount" can refer to an amount of a functional agent or of a pharmaceutical composition useful for exhibiting a detectable therapeutic or inhibitory effect. The effect can be detected by any assay method known in the art.

As used herein, the terms "administer," "administering," "administered" or "administration" refer to providing a compound or a composition (e.g., one described herein), to a subject or patient. For example, a compound or composition may be administered orally to a patient (i.e., the subject receives the compound or composition via the mouth, as a pill, capsule, liquid, or in other form suitable for administration via the mouth. Oral administration may be buccal (where the compound or composition is held in the mouth, e.g., under the tongue, and absorbed there). Administration may be by enteral administration (including e.g., by tube, such as a nasogastric, orogastric, duodenal, or gastronomy tube). Administration may be by injection, i.e., delivery of the compound or composition via a needle, microneedle, pressure injector, or other means of puncturing the skin or forcefully passing the compound or composition through the skin of the subject. Injection may be intravenous (i.e., into a vein); intraarterial (i.e., into an artery); intraperitoneal (i.e., into the peritoneum); intramuscular (i.e., into a muscle); or by other route of injection. Routes of administration may also include rectal, vaginal, transdermal, via the lungs (e.g., by inhalation), subcutaneous (e.g., by absorption into the skin from an implant containing the compound or composition), or by other route.

As used herein, the term "AUC" refers to the area under the curve (of plasma concentration over time after administration of a drug). AUC provides a measure of the plasma level of an administered drug that is not tied to a single time measurement.

As used herein, the term "$AUC_{0-24}$" refers to the AUC from time 0 to 24 hours after administration (where time 0 is the time that the drug of interest is administered).

As used herein, the term "$AUC_{inf}$" refers to the AUC from time 0 extrapolated to infinity (where time 0 is the time that the drug of interest is administered).

As used herein, the term "$AUC_{last}$" refers to the AUC from time 0 until the time of the last measurable concentration of the administered drug (e.g., dazucorilant).

As used herein, the term "$C_{max}$" refers to the maximum plasma concentration of the administered drug (e.g., dazucorilant) following administration.

As used herein, the term "combination therapy" refers to the administration of at least two pharmaceutical agents to a subject to treat a disease. The at least two agents may be administered simultaneously, or sequentially in any order during the entire or portions of the treatment period. The at least two agents may be administered following the same or different dosing regimens. In some cases, one agent is administered following a scheduled regimen while the other agent is administered intermittently. In some cases, both agents are administered intermittently. In some embodiments, the one pharmaceutical agent, e.g., a SGRM such as dazucorilant, is administered daily, and the other pharmaceutical agent, e.g., riluzole, edaravone, or other drug, may be administered every day, or every two, three, or four days, or according to another schedule. In some embodiments, the one pharmaceutical agent, e.g., a SGRM such as dazucorilant, is administered every day, or every two, three, or four days, or according to another schedule; in such embodiments, the other pharmaceutical agent, e.g., riluzole, edaravone, or other drug, may be administered every day, or every two, three, or four days, or according to another schedule.

As used herein, the term "glucocorticoid receptor" ("GR") refers to the type II GR, a family of intracellular receptors which specifically bind to glucocorticoids such as cortisol and/or cortisol analogs such as dexamethasone (See, e.g., Turner & Muller, J. Mol. Endocrinol. Oct. 1, 2005 35 283-292). (The term "glucocorticoid" may be abbreviated as "GC".) The type II glucocorticoid receptor is also referred to as the cortisol receptor. The term includes isoforms of GR, recombinant GR and mutated GR.

The term "glucocorticoid receptor modulator" (GRM) refers to any compound which modulates glucocorticoid binding to GR, or which modulates any biological response associated with the binding of GR to an agonist. For example, a GRM that acts as an agonist, such as dexamethasone, increases the activity of tyrosine aminotransferase (TAT) in HepG2 cells (a human liver hepatocellular carcinoma cell line; ECACC, UK). A GRM that acts as an antagonist, such as mifepristone, decreases the activity of tyrosine aminotransferase (TAT) in HepG2 cells. TAT activity can be measured as outlined in the literature by A. Ali et al., J. Med. Chem., 2004, 47, 2441-2452.

As used herein, the term "selective glucocorticoid receptor modulator" (SGRM) refers to a selective GRM, that is, a composition or compound which selectively modulates glucocorticoid binding to GR, or selectively modulates any biological response associated with the binding of a GR to an agonist. By "selective," the drug preferentially binds to the GR rather than other nuclear receptors, such as the progesterone receptor (PR), the mineralocorticoid receptor (MR) or the androgen receptor (AR). It is preferred that the selective glucocorticoid receptor modulator bind GR with an affinity that is 10× greater ($1/10^{th}$ the $K_d$ value) than its affinity to the MR, AR, or PR, both the MR and PR, both the MR and AR, both the AR and PR, or to the MR, AR, and PR. Dazucorilant is a SGRM.

Exemplary heteroaryl ketone fused azadecalin GRM and SGRM compounds include those described in U.S. Pat. No. 8,859,774; in U.S. Pat. No. 9,273,047; in U.S. Pat. No. 9,707,223; and in U.S. Pat. No. 9,956,216, all of which patents are hereby incorporated by reference in their entireties. In embodiments, the heteroaryl ketone fused azadecalin GRM is the SGRM dazucorilant (Example 1 of U.S. Pat. No. 8,859,774).

As used herein, the term "compound" is used to denote a molecular moiety of unique, identifiable chemical structure. A molecular moiety ("compound") may exist in a free species form, in which it is not associated with other molecules. A compound may also exist as part of a larger aggregate, in which it is associated with other molecule(s), but nevertheless retains its chemical identity. A solvate, in which the molecular moiety of defined chemical structure ("compound") is associated with a molecule(s) of a solvent, is an example of such an associated form. A hydrate is a solvate in which the associated solvent is water. The recitation of a "compound" refers to the molecular moiety itself (of the recited structure), regardless of whether it exists in a free form or an associated form.

As used herein, the term "composition" is intended to encompass a product comprising the specified ingredients such as the said compounds, their tautomeric forms, their derivatives, their analogues, their stereoisomers, their polymorphs, their deuterated species, their pharmaceutically acceptable salts, esters, ethers, metabolites, mixtures of isomers, their pharmaceutically acceptable solvates and pharmaceutically acceptable compositions in specified amounts, as well as any product which results, directly or indirectly, from combination of the specified ingredients in the specified amounts. Such term in relation to a pharmaceutical composition is intended to encompass a product comprising the active ingredient (s), and the inert ingredient (s) that make up the carrier, as well as any product which results, directly or indirectly, in combination, complexation or aggregation of any two or more of the ingredients, or from dissociation of one or more of the ingredients, or from other types of reactions or interactions of one or more of the ingredients. Accordingly, the pharmaceutical compositions of the present invention are meant to encompass any composition made by admixing compounds of the present invention with pharmaceutically acceptable carriers.

As used herein, the term "pharmaceutically acceptable carrier" is intended to include any and all solvents, dispersion media, coatings, antibacterial and antifungal agents, isotonic and absorption delaying agents, and the like, compatible with pharmaceutical administration. The use of such media and agents for pharmaceutically active substances is well known in the art. Except insofar as any conventional media or agent is incompatible with the active compound, use thereof in the compositions is contemplated. Supplementary active compounds can also be incorporated into the compositions.

"Pharmaceutically-acceptable excipient" and "pharmaceutically-acceptable carrier" refer to a substance that aids the administration of an active agent to—and absorption by—a subject and can be included in the compositions of the present invention without causing a significant adverse toxicological effect on the patient. As used herein, these terms are intended to include any and all solvents, dispersion media, coatings, antibacterial and antifungal agents, antioxidant agents, isotonic and absorption delaying agents, and the like, compatible with pharmaceutical administration. Non-limiting examples of pharmaceutically-acceptable excipients include water, NaCl, normal saline solutions, lactated Ringer's, normal sucrose, normal glucose, binders, fillers, disintegrants, encapsulating agents, plasticizers, lubricants, coatings, sweeteners, flavors and colors, and the like. One of ordinary skill in the art will recognize that other pharmaceutical excipients are useful in the present invention. The use of such media and agents for pharmaceutically active substances is well known in the art. Except insofar as any conventional media or agent is incompatible with the active compound, use thereof in the compositions is contemplated. Supplementary active compounds can also be incorporated into the compositions. One of ordinary skill in the art will recognize that other pharmaceutical excipients are useful in the present invention.

"Salt" refers to acid or base salts of the compounds used in the methods disclosed herein. Illustrative examples of pharmaceutically acceptable salts are mineral acid (hydrochloric acid, hydrobromic acid, phosphoric acid, and the like) salts, organic acid (acetic acid, propionic acid, glutamic acid, citric acid, and the like) salts, and quaternary ammonium (methyl iodide, ethyl iodide, and the like) salts. It is understood that the pharmaceutically acceptable salts are non-toxic. Additional information on suitable pharmaceutically acceptable salts can be found in Remington's Pharmaceutical Sciences, 17th ed., Mack Publishing Company, Easton, Pa., 1985, which is incorporated herein by reference.

Pharmaceutical Compositions and Administration

In embodiments, the present invention provides a pharmaceutical composition for treating ALS, the pharmaceutical composition including a pharmaceutically acceptable excipient and a GRM such as, e.g., dazucorilant. In some embodiments, the pharmaceutical composition includes a pharmaceutically acceptable excipient and a SGRM. In preferred embodiments, the pharmaceutical composition includes dazucorilant and a pharmaceutically acceptable excipient or excipients.

Suitable formulations can be prepared and administered in a wide variety of oral, parenteral and topical dosage forms. GRMs can be administered orally. For example, the GRM can be administered as a pill, a capsule, or liquid formulation as described herein. Oral preparations include tablets, pills, powder, dragees, capsules, liquids, lozenges, gels, syrups, slurries, suspensions, etc., suitable for ingestion by the patient.

For example, dazucorilant has been formulated in different ways: for example, a formulation that is lipid formulation classification system (LFCS) Type III; and a formulation of LFCS Type IV. These formulations were evaluated encapsulated in hard shell capsules (Type III and Type IV); and encapsulated in a soft gelatin (softgel) capsules (LFCS Type IV).

For preparing pharmaceutical compositions from GRMs and SGRMs, pharmaceutically acceptable carriers can be either solid or liquid. Solid form preparations include powders, tablets, pills, capsules, cachets, suppositories, and dispersible granules. A solid carrier can be one or more substances, which may also act as diluents, flavoring agents, binders, preservatives, tablet disintegrating agents, or an encapsulating material. Details on techniques for formulation and administration are well described in the scientific and patent literature, see, e.g., the latest edition of Remington's Pharmaceutical Sciences, Mack Publishing Co, Easton PA ("Remington's").

In powders, the carrier is a finely divided solid, which is in a mixture with the finely divided active component, a GRM or SGRM, e.g., dazucorilant. In tablets, the active component is mixed with the carrier having the necessary binding properties in suitable proportions and compacted in the shape and size desired.

The powders and tablets preferably contain from 5% or 10% to 70% of the active compound (e.g., dazucorilant). Suitable carriers are magnesium carbonate, magnesium stearate, talc, sugar, lactose, pectin, dextrin, starch, gelatin, tragacanth, methylcellulose, sodium carboxymethylcellulose, a low melting wax, cocoa butter, and the like. The term "preparation" is intended to include the formulation of the active compound with encapsulating material as a carrier providing a capsule in which the active component with or without other carriers, is surrounded by a carrier, which is thus in association with it. Similarly, cachets and lozenges are included. Tablets, powders, capsules, pills, cachets, and lozenges can be used as solid dosage forms suitable for oral administration.

Suitable solid excipients are carbohydrate or protein fillers which may include, but are not limited to, sugars including lactose, sucrose, mannitol, or sorbitol; starch from corn, wheat, rice, potato, or other plants; cellulose such as methyl cellulose, hydroxypropylmethyl-cellulose, or sodium carboxymethylcellulose; and gums including arabic and tragacanth; as well as proteins such as gelatin and collagen. If desired, disintegrating or solubilizing agents may be added, such as the cross-linked polyvinyl pyrrolidone, agar, alginic acid, or a salt thereof, such as sodium alginate.

Dragee cores are provided with suitable coatings such as concentrated sugar solutions, which may also contain gum arabic, talc, polyvinylpyrrolidone, carbopol gel, polyethylene glycol, and/or titanium dioxide, lacquer solutions, and suitable organic solvents or solvent mixtures. Dyestuffs or pigments may be added to the tablets or dragee coatings for product identification or to characterize the quantity of active compound (i.e., dosage). Pharmaceutical preparations of the invention can also be used orally using, for example, push-fit capsules made of gelatin, as well as soft, sealed capsules made of gelatin and a coating such as glycerol or sorbitol. Push-fit capsules can contain GR modulator mixed with a filler or binders such as lactose or starches, lubricants such as talc or magnesium stearate, and, optionally, stabilizers. In soft capsules, the GR modulator compounds may be dissolved or suspended in suitable liquids, such as fatty oils, liquid paraffin, or liquid polyethylene glycol with or without stabilizers.

Liquid form preparations include solutions, suspensions, and emulsions, for example, water or water/propylene glycol solutions. Liquid formulations may include a salt, such as, e.g., sodium chloride, or a sugar, such as, e.g., sucrose. For parenteral injection, liquid preparations can be formulated in solution in aqueous polyethylene glycol solution.

The pharmaceutical compositions disclosed herein can be provided as a salt and can be formed with many acids, including but not limited to hydrochloric, sulfuric, acetic, lactic, tartaric, malic, succinic, etc. Salts tend to be more soluble in aqueous or other protonic solvents that are the corresponding free base forms. In other cases, the preparation may be a lyophilized powder in 1 mM-50 mM histidine, 0.1%-2% sucrose, 2%-7% mannitol at a pH range of 4.5 to 5.5, that is combined with buffer prior to use.

GRMs and SGRMs can be administered by oral administration, and by enteral administration. Alternatively, GRMs and SGRMs can also be administered by injection, that is, intravenously, intramuscularly, intracutaneously, subcutaneously, intraduodenally, or intraperitoneally. In embodiments, the compositions of the present invention are useful for parenteral administration, such as intravenous (IV) administration or administration into a body cavity or lumen of an organ. The formulations for administration will commonly comprise a solution of the compositions of the present invention dissolved in a pharmaceutically acceptable carrier. Among the acceptable vehicles and solvents that can be employed are water and Ringer's solution, an isotonic sodium chloride. In addition, sterile fixed oils can conventionally be employed as a solvent or suspending medium. For IV administration, the formulation can be a sterile injectable preparation, such as a sterile injectable aqueous or oleaginous suspension. This suspension can be formulated according to the known art using those suitable dispersing or wetting agents and suspending agents. The sterile injectable preparation can also be a sterile injectable solution or suspension in a nontoxic parenterally-acceptable diluent or solvent, such as a solution of 1,3-butanediol.

Also included are solid form preparations, which are intended to be converted, shortly before use, to liquid form preparations for oral administration. Such liquid forms include solutions, suspensions, and emulsions. These preparations may contain, in addition to the active component, colorants, flavors, stabilizers, buffers, artificial and natural sweeteners, dispersants, thickeners, solubilizing agents, and the like.

Oil suspensions can be formulated by suspending a SGRM in a vegetable oil, such as arachis oil, olive oil, sesame oil or coconut oil, or in a mineral oil such as liquid paraffin; or a mixture of these. The oil suspensions can contain a thickening agent, such as beeswax, hard paraffin or cetyl alcohol. Sweetening agents can be added to provide a palatable oral preparation, such as glycerol, sorbitol or sucrose. These formulations can be preserved by the addition of an antioxidant such as ascorbic acid. As an example of an injectable oil vehicle, see Minto, *J. Pharmacol. Exp. Ther.* 281:93-102, 1997. The pharmaceutical formulations of the invention can also be in the form of oil-in-water emulsions. The oily phase can be a vegetable oil or a mineral oil, described above, or a mixture of these. Suitable emulsifying agents include naturally-occurring gums, such as gum acacia and gum tragacanth, naturally occurring phosphatides, such as soybean lecithin, esters or partial esters derived from fatty acids and hexitol anhydrides, such as sorbitan mono-oleate, and condensation products of these partial esters with ethylene oxide, such as polyoxyethylene sorbitan mono-oleate. The emulsion can also contain sweetening agents and flavoring agents, as in the formulation of syrups and elixirs. Such formulations can also contain a demulcent, a preservative, or a coloring agent.

The pharmaceutical preparation is preferably in unit dosage form. In such form the preparation is subdivided into unit doses containing appropriate quantities of the active component, a GRM or SGRM such as, e.g., dazucorilant. The unit dosage form can be a packaged preparation, the package containing discrete quantities of preparation, such as packeted tablets, capsules, and powders in vials or ampoules. Also, the unit dosage form can be a capsule, tablet, cachet, or lozenge itself, or it can be the appropriate number of any of these in packaged form.

The quantity of active component in a unit dose preparation may be varied or adjusted from 1 mg to 1000 mg, more typically 10 mg to 600 mg, most typically 50 mg to 500 mg. Suitable dosages also include about 10 mg, 20, 30, 40, 50, 60, 70, 75, 80, 90, 100, 150, 200, 250, 300, 400, 500, or 600 mg, according to the particular application and the potency of the active component. The composition can, if desired, also contain other compatible therapeutic agents.

In some embodiments, the GRM is administered in one dose. In other embodiments, the GRM is administered in more than one dose, e.g., 2 doses, 3 doses, 4 doses, 5 doses, 6 doses, 7 doses, or more. In some cases, the doses are of an equivalent amount. In other cases, the doses are of different amounts. The doses can increase or taper over the duration of administration. The amount will vary according to, for example, patient characteristics.

Single or multiple administrations of formulations can be administered depending on the dosage and frequency as required and tolerated by the patient. In embodiments, the effective amount of GRM, such as dazucorilant, is administered in a single dose. In other embodiments, the GRM is administered in more than one dose, e.g. 2 doses, 3 doses, or more doses over a 2-12 hour period, e.g., a 2 hour period, a 3 hour period, a 4 hour period, a 5 hour period, a 6 hour period, a 7 hour period, a 8 hour period, a 9 hour period, a 10 hour period, a 11 hour period, a 12 hour period, or other period of time. The formulations should provide a sufficient quantity of active agent to effectively treat ALS. Thus, in one embodiment, the pharmaceutical formulation for oral administration of a GRM such as dazucorilant is in a daily amount of between about 1 to about 20 mg per kilogram of body weight per day (mg/kg/day), or in a daily amount from about 1.5 to 15 mg/kg/day, or from about 2 to 10 mg/kg/day.

Any suitable GRM dose may be used in the methods disclosed herein. The dose of GRM, e.g., dazucorilant, that is administered can be at least about 10 milligrams per day (mg/day), or about 20 mg/day, or about 25 mg/day, or about 30 mg/day, or about 50 mg/day, or about 75 mg/day, or about 100 mg/day, or about 125 mg/day, or about 150 mg/day, or about 175 mg/day, or about 200 mg/day, or about 225 mg/day, about 250 mg/day, about 300 mg/day, about 350 mg/day, about 375 mg/day, about 400 mg/day, about 450 mg/day, about 500 mg/day, about 525 mg/day, about 600 mg/day, or more. In embodiments, the GRM is administered orally. In some embodiments, the GRM is administered in at least one dose. In other words, the GRM can be administered in 1, 2, 3, 4, 5, 6, 7, 8, 9, 10 or more doses. In embodiments, the GRM is administered orally in 1, 2, 3, 4, 5, 6, 7, 8, 9, 10 or more doses.

The duration of treatment with a GRM or SGRM to treat ALS can vary according to the severity of the condition in a subject and the subject's response to GRMs or SGRMs. In embodiments, the treatment may continue as long as needed. In embodiments, the treatment may continue as long as the patient is capable of receiving oral medication. In some embodiments, dazucorilant may be administered for a period of up to about 2 years or more. In embodiments, administration of a heteroaryl ketone fused azadecalin GRM or SGRM, such as dazucorilant, may continue for 1, 2, 3, 4, 5, 10, 15, 20, 24, 30, 36, 48, 50, 52, 100, 104, 156, or 208 weeks, or longer, as needed to treat the patient. In embodiments, administration of a GRM such as dazucorilant may continue for as long as the patient needs such administration, or for as long as the patient remains capable of receiving such GRM administration.

In some embodiments, administration of a GRM or SGRM is not continuous and can be stopped for one or more periods of time, followed by one or more periods of time where administration resumes. Suitable periods where administration stops include 1 to 10 weeks, 2 to 8 weeks, 3 to 6 weeks, and 4 to 5 weeks.

SGRMs can be used in combination with other active agents known to be useful in modulating a glucocorticoid receptor, or with adjunctive agents that may not be effective alone, but may contribute to the efficacy of the active agent. For example, dazucorilant may be administered to a patient suffering from ALS along with riluzole, or edaravone, or along with both riluzole and edaravone. Dazucorilant may be administered to a patient suffering from ALS along with other drugs, including Tiglutik®; Exservan™; RELY-VRIO™; Nuedexta®; sodium phenylbutyrate; taurursodiol; dextromethorphan; quinidine sulfate; or other drug used for the treatment of ALS or related condition. Such administration may be via oral administration; via enteral administration; or by other means or combination of means.

In some embodiments, co-administration includes administering one active agent, a GRM or SGRM, within 0.5, 1, 2, 4, 6, 8, 10, 12, 16, 20, or 24 hours of a second active agent. Such a second active agent may be, for example, riluzole or edaravone. Co-administration includes administering two active agents simultaneously, approximately simultaneously (e.g., within about 1, 5, 10, 15, 20, or 30 minutes of each other), or sequentially in any order. In some embodiments, co-administration can be accomplished by co-formulation, i.e., preparing a single pharmaceutical composition including both active agents. In other embodiments, the active agents can be formulated separately. In another embodiment, the active and/or adjunctive agents may be linked or conjugated to one another.

After a pharmaceutical composition including a GR modulator of the invention has been formulated in an acceptable carrier, it can be placed in an appropriate container and labeled for treatment of an indicated condition. For administration of a GRM or SGRM, such labeling would include, e.g., instructions concerning the amount, frequency and method of administration.

EXAMPLES

The following example is provided by way of illustration only and not by way of limitation. Those of skill will readily recognize a variety of noncritical parameters which could be changed or modified to yield essentially similar results.

Example 1. Dazucorilant In Vitro Testing

Dazucorilant binds competitively and reversibly to GR with high affinity (0.28 nM). Functional GR antagonism has been demonstrated in vitro by the ability of dazucorilant to inhibit the effects of dexamethasone (a potent and selective GR agonist) on tyrosine aminotransferase (TAT) activity in a human liver carcinoma cell line ($K_i$, 14 nM) and a rat hepatoma cell line (Kc, 4.2 nM). Dazucorilant prevented the dexamethasone-induced increase in TAT activity in primary hepatocytes from monkeys and humans. Dazucorilant is selective for GR over other nuclear hormone receptors, and a range of other receptors, enzymes, and ion channels. For example, dazucorilant has high selectivity for GR relative to the progesterone receptor (PR), androgen receptor, and estrogen receptor, showing no significant binding to these receptors at a concentration of 10 μM (0%, 1.5% and 37.5%, respectively). Selectivity for GR over the mineralocorticoid receptor (MR) was demonstrated using an MR reporter gene assay, in which dazucorilant showed 23% inhibition at a concentration of 5 μM.

The in vivo distribution of dazucorilant was determined in a quantitative whole-body autoradiography (QWBA) study in rats. Following a single oral administration of $^{14}$C- dazucorilant to male and female rats, radioactivity was steadily absorbed, with maximal tissue concentrations generally occurring at around 12 hours post-dose. Tissue:blood ratios of >0.1 in the brain and spinal cord during the first 24 hours after dosing indicated that drug-related material crossed the blood brain barrier.

In vivo efficacy at reducing symptoms associated with ALS has been demonstrated in the Wobbler mouse, a well-recognized model of ALS. Administration of dazucorilant for 21 days ameliorated many aspects of disease in these mice, including reducing forepaw atrophy, overcoming the impaired performance in the rotarod test, and inhibiting neurodegeneration and inflammation.

Example 2. Pharmacokinetics And Pharmacodynamics of Dazucorilant in Healthy Volunteers An adaptive dose, double-blind, placebo-controlled study (NCT04249323, EudraCT 2019-004258-27) was conducted in 110 healthy male and female volunteers (18-60 years old; BMI 18-30 kg/m2; weight≤102 kg; "First In Human" (FIH) study). The study assessed dazucorilant safety, tolerability, pharmacokinetics (PK) and pharmacodynamics (PD). In Part 1, healthy volunteers were administered single ascending dazucorilant doses (50-1000 mg) with or without food (n=63). In Part 2, healthy volunteers were administered multiple dazucorilant doses (100-300 mg once daily [QD] for 14 days; n=36). In Part 3, healthy volunteers were administered dazucorilant in order to establish proof of pharmacological effect (n=11). In addition, brain penetration of dazucorilant in humans was studied in a phase 1, randomized, partially double-blind, placebo-controlled study (NCT04994743, EudraCT 2021-002456-36) in 16 healthy male volunteers (18-65 years old; BMI 18-30 kg/m2; weight≤100 kg) to evaluate the PK of multiple oral dazucorilant doses (150 mg or 300 mg QD fed for 14 days) in plasma and cerebrospinal fluid (CSF).

Figure 2A:
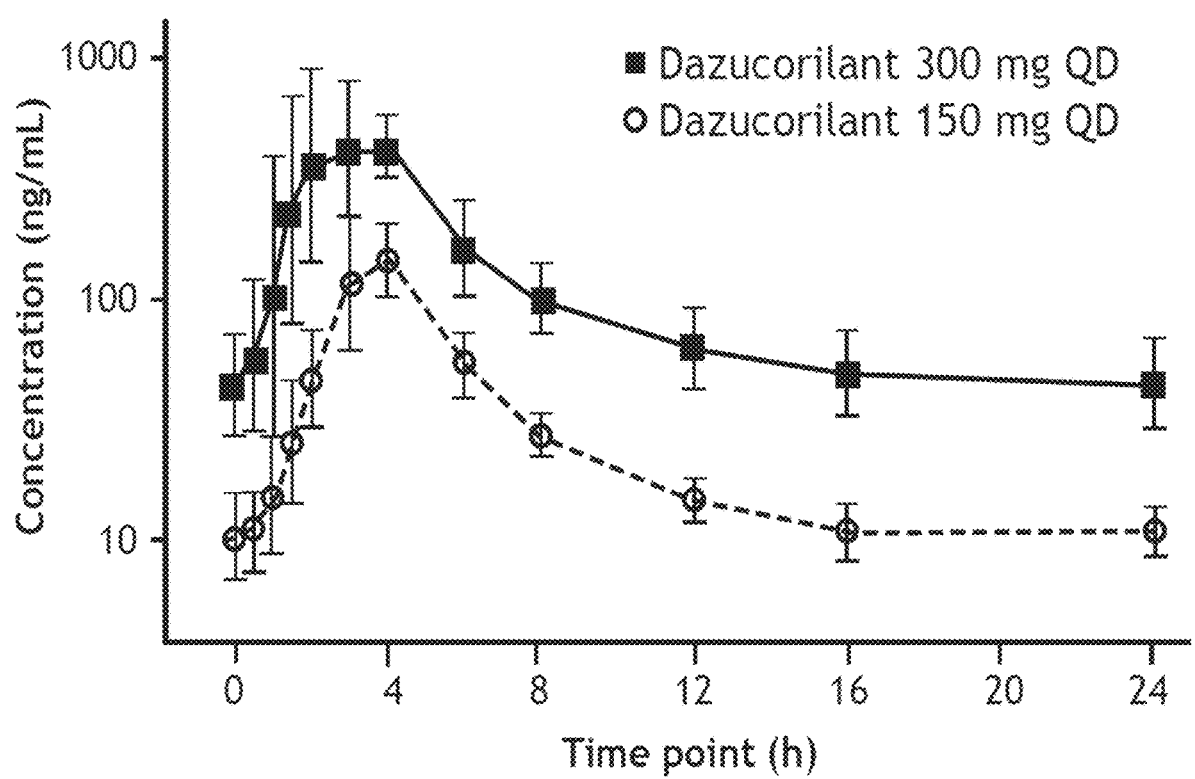
FIG. 2A shows the dazucorilant steady-state PK profile after 14 days of QD dosing in the brain penetration study.

Results: Single doses of dazucorilant up to 1000 mg (in fasted subjects) and 900 mg (in fed subjects) were considered safe and well tolerated. Multiple doses up to 300 mg QD were considered safe; multiple doses up to 200 mg QD were safe and generally well tolerated. No serious or severe treatment-emergent adverse events were reported; the most common adverse events were gastrointestinal, nervous system, musculoskeletal, and connective tissue disorders. A positive food effect (1.3- to 1.7-fold increased exposure with food) was noted (see FIGS. 1A and 1B). A greater than dose-proportional increase in dazucorilant exposures following oral administration of 300 mg dazucorilant relative to 150 mg dazucorilant was observed. Multiple dosing led to an approximately 2-fold accumulation in plasma; steady state exposures were achieved in approximately 7 days (see FIGS. 2A and 2B). Dazucorilant distribution to the CSF was observed, confirming brain penetration.

Greater Than Dose-Proportional Increase in Exposures and Positive Food Effect in First in Human Study Following a 3-fold dose escalation (150 mg to 450 mg fasted), dazucorilant exposures, measured by $AUC_{(0-inf)}$ and $C_{max}$, increased by 4.0- and 3.4-fold, respectively (Table 1). Following a further 2-fold dose escalation (450 mg to 900 mg fed), exposures increased by 2.8- and 2.2-fold (Table 1).

TABLE 1

Dazucorilant dose dependence (n = 6 each)

| Adjusted geometric mean) | 450 mg FASTED | 150 mg FASTED | Ratio High:Low Dose (%); 90% CI |
|---|---|---|---|
| $C_{max}$/D (ng/mL/mg) | 0.557 | 0.494 | 112.9 (68.6, 185.8) |
| $AUC_{(0-last)}$/D (ng*h/mL/mg) | 2.62 | 1.69 | 155.2 (93.6, 257.4) |
| $AUC_{(0-inf)}$/D (ng*h/mL/mg) | 2.86 | 2.18 | 131.3 (73.0, 236.4) |
| | 900 mg FED | 450 mg FED | |
| $C_{max}$/D (ng/mL/mg) | 1.23 | 1.13 | 109.2 (66.4, 179.7) |
| $AUC_{(0-last)}$/D (ng*h/mL/mg) | 8.33 | 6.56 | 127.0 (76.6, 210.7) |
| $AUC_{(0-inf)}$/D (ng*h/mL/mg) | 10.2 | 7.17 | 42.3 (79.0, 256.1) |

ANOVA model of natural log-transformed PK parameters from part 1 of the FIH study, including a term for treatment fitted as fixed effect. PK parameters normalized to the equivalent of a 1-mg dose. AUC, area under the curve; CI, confidence interval; $C_{max}$, maximum concentration; D, dose.

A significant positive food effect following administration with a high-fat breakfast vs fasting was observed, resulting in a >2-fold increase in exposure (Table 2).

TABLE 2

Food effect on dazucorilant exposures (n = 6 each).

| (Adjusted geometric mean) | 450 mg FASTED | 450 mg FED | Ratio Fed:Fasted (%) 90% CI | P-value |
|---|---|---|---|---|
| $C_{max}$ (ng/mL) | 251 | 508 | 202.3 (122.9, 333.2) | 0.028 |
| $AUC_{(0-last)}$ (ng*h/mL) | 1180 | 2950 | 250.7 (170.4, 368.9) | 0.002 |
| $AUC_{(0-inf)}$ (ng*h/mL) | 1290 | 3220 | 250.7 (169.8, 370.2) | 0.002 |

ANOVA model of natural log-transformed PK parameters from part 1 of the FIH study, including a term for treatment fitted as fixed effect. CI, confidence interval; $C_{max}$, maximum concentration; AUC, area under the curve.

2-Fold Accumulation in Plasma and Steady State Exposures Achieved After ~7 Days in Brain Penetration Study After 1 week of QD dosing in the brain penetration study, the accumulation ratios of $AUC_{(0-24)}$ and $C_{max}$ (day 1 to day 7) showed 1.7- to 1.9-fold increased exposures for dazucorilant 150 mg or 300 mg fasted. After 2 weeks of QD dosing (day 1 to day 14), exposures increased by 1.6- to 2.0-fold (based on accumulation ratios of $AUC_{0-24}$ and $C_{max}$). The accumulation ratios for day 7 to day 14 ranged between 0.9 and 1.1, indicating that dazucorilant exposure had reached a steady state within 1 week of QD dosing. Steady state exposures ($C_{max}$, $AUC_{0-24}$) were approximately 4-fold higher with 300 vs. 150 mg dazucorilant. (See FIG. 2A.)

Dazucorilant has the Anticipated Pharmacological Effect

A single dose of prednisone decreased eosinophils, lymphocytes, and osteocalcin, and increased neutrophils, as expected. Dazucorilant ameliorated the effect of prednisone on these parameters, as indicated by a statistically significant difference in $AUEC_{(0-24)}$ change from baseline for eosinophils, lymphocytes, and osteocalcin with prednisone+dazucorilant vs. prednisone alone (Table 3). Similar to other SGRMs (Pivonello et al., Front Endocrinol (Lausanne). 2021; 12:662865), no notable effects of dazucorilant on morning or evening cortisol or ACTH levels were observed in part 2 of the FIH study.

TABLE 3

Proof of pharmacological effect of Dazucorilant (n = 9 each).

| (Adjusted arithmetic mean) | Prednisone (25 mg) | Prednisone + dazucorilant 450 mg fed | Difference 95% CI | P-value |
|---|---|---|---|---|
| EOSINOPHILS $AUEC_{(0-24)}$ cfb ($10^9$*h/L) | −2.80 | −1.86 | 0.95 (0.22, 1.67) | 0.019 |
| LYMPHOCYTES $AUEC_{(0-24)}$ cfb ($10^9$*h/L) | −2.470 | 0.134 | 2.604 (0.588, 4.619) | 0.019 |
| NEUTROPHILS $AUEC_{(0-24)}$ cfb ($10^9$*h/L) | 74.7 | 82.4 | 7.8 (−2.1, 17.7) | ns |
| OSTEOCALCIN $AUEC_{(0-24)}$ cfb ($10^9$*h/L) | −151 | −123 | 28 (3, 54) | 0.032 |

Linear mixed model of PD parameter estimates from part 3 of the FIE study, including terms for treatment fitted as a fixed effect, subject fitted as a random effect, and baseline concentration values fitted as a covariate. AUEC, area under the effect curve; cfb, change from baseline; CI, confidence interval; Emax, maximum change; ns, not significant.

In the brain penetration study, following 1 week of QD dosing with dazucorilant 150 mg and 300 mg under fed conditions, dazucorilant was detectable in the CSF in all study participants. This result demonstrates brain penetration by dazucorilant in humans.

Safe and Well-Tolerated Doses of Dazucorilant Identified

Single doses of dazucorilant up to 1000 mg fasted and 900 mg fed were considered safe and well tolerated. Multiple doses up to 300 mg QD were considered safe; multiple doses up to 200 mg QD were safe and generally well tolerated.

Conclusions: The presented studies established the pharmacokinetics, safety, tolerability, and pharmacological effects of dazucorilant in healthy volunteers. Across the presented studies, 111 healthy volunteers received dazucorilant. Adverse events were mild to moderate and reflective of a lack of tolerability at higher doses; no significant safety concerns were identified.

Example 3. A Phase 2, Multicenter, Randomized, Double-Blind, Placebo-Controlled Study Evaluating Safety and Efficacy of Dazucorilant in Patients With Amyotrophic Lateral Sclerosis A phase 2 study (DAZALS, NCT05407324, EudraCT 2021-005611-31) is ongoing to assess whether dazucorilant can benefit patients with ALS by slowing functional loss.

Figure 3:
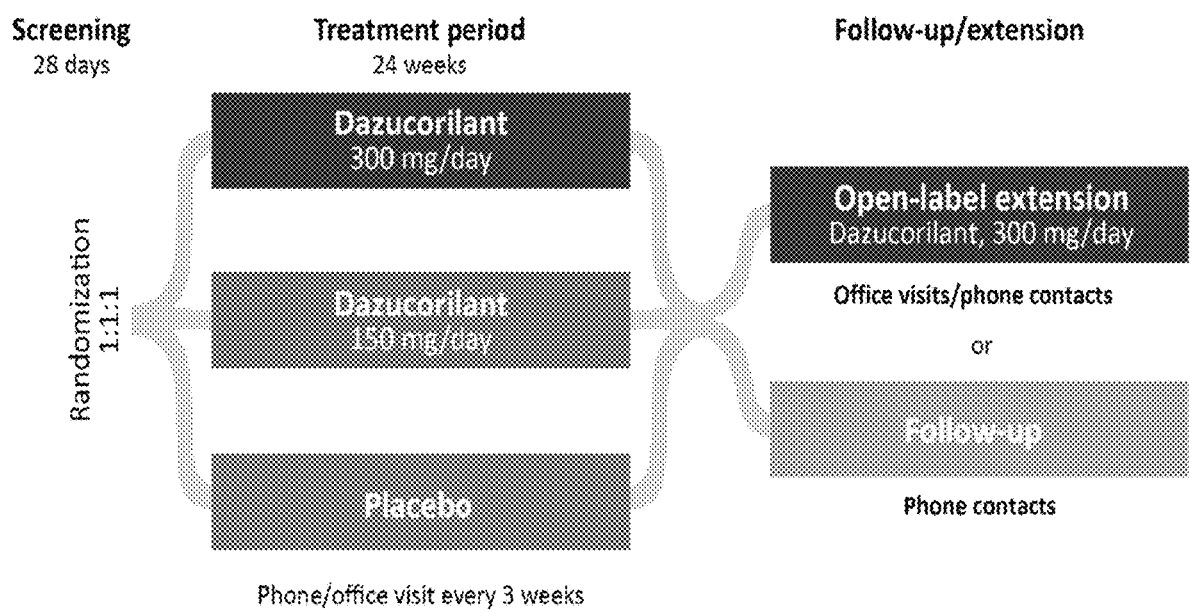
FIG. 3 shows the timeline for the Phase 2 study of dazucorilant for the treatment of ALS disclosed herein.

Illustration of the Study: A schematic illustration of the timelines followed by subjects in the study receiving dazucorilant at 150 mg/day, 300 mg/day or placebo is presented in FIG. 3.

Eligibility Criteria: Patients must be at least 18 years of age and suffer from ALS (sporadic or familial). Patients with an ENCALS Risk Profile score greater than or equal to −6 and less than or equal to −3 are eligible for enrollment in the study. The patient may have received treatment with riluzole and/or edaravone; however, such prior treatment is not required. If riluzole and/or edaravone treatment is ongoing, the patient must be on a stable dose (i.e., the dose of riluzole or edaravone does not change during the study). Patients with the following are excluded from enrollment: a history of clinically significant non-ALS neurologic disorder; an inability to swallow capsules; renal or hepatic impairment; low platelet count; any use of non-invasive ventilation (e.g., CPAP) for any portion of the day at time of screening; mechanical ventilation via tracheostomy at time of screening; use of any form of oxygen supplementation at time of screening; current use of glucocorticoids; requiring regular systemic glucocorticoid use; or history of any clinically significant disorder or unstable medical condition other than ALS.

Identification of patients with ALS Eligible for the Study: Eligible patients with ALS are those whose disease is not far advanced, nor slowly progressing as assessed using the ENCALS risk profile calculator. Thus, eligibility criteria are designed to exclude patients in advanced disease stages or those patients whose disease progression is slow. Progression rates in ALS are determined by multiple interdependent patient characteristics, including:

ENCALS Risk Profile: Patients having an ENCALS Score ≥−6 and ≤−3 will be eligible for enrollment. Eligibility criteria exclude patients with a very slow progression (long survival) and patients with a very fast progression (very short survival). The ENCALS Risk Profile accounts for the prognostic effects of 7 patient characteristics in a single score to better estimate the patient's overall prognosis when determining study eligibility (Westeneng et al., *Lancet Neurol*. 2018;17(5):423-433; van Eijk et al., *Neurology*. 2019;92 (5): e451—e460; van Eijk et al., *Neurology*. 2021; 97(11):528-536).

Patient information includes: Date of screening; Date of birth; Date of diagnosis; Date of symptom onset; E1 Escorial Definite classification; Site of symptom onset; Presence of fronto-temporal dementia; ALSFRS-R total score at screening; Vital capacity at screening; and may include other patient information.

Study Design: Patients with ALS will be screened prior to entry into the study; those meeting eligibility criteria will be randomly assigned to one of three study groups: a placebo group, a group receiving 150 mg dazucorilant per day, and a group receiving 300 mg dazucorilant per day. The enrollment target is to enroll 198 patients with ALS; patient randomization will be stratified according to the following factors: Use of ALS medications riluzole and/or edaravone (yes/no); and Region of disease onset (bulbar/other). Plasma samples will be collected in approximately 20% of patients at week 3 for pharmacokinetic analysis. Patients who complete the treatment period and meet Open Label Extension (OLE) eligibility criteria may enroll and receive dazucorilant for up to a further 132 weeks.

Patients in each of the three groups will receive study drugs daily for 24 weeks. Patients will be contacted (either by telephone, or by an office visit) every 3 weeks during the initial 24 week treatment period. Following the 24 week treatment period, a follow-up period of up to 132 weeks for a) follow-up without drug, or b) open-label extension period during which the patients receive 300 mg per day dazucorilant for up to 132 weeks. Patients will be contacted by telephone every 8 to 24 weeks during the follow-up without drug or every 4, 12, or 16 weeks (either by telephone, or by an office visit) for open-label extension period.

Study drugs administered to the patients (dazucorilant or placebo) are provided as 75 mg softgel capsules. The study drugs will be administered orally once daily with food and water, at approximately the same time each day.

Primary study endpoints include: ALS Functional Rating Scale-Revised (ALSFRS-R) total score (change from baseline to week 24) and Safety. Secondary endpoints include: Changes in % slow vital capacity; changes in muscle strength (using hand-held dynamometer); changes in quality of life (5Q-5D-5L). Further secondary endpoints include Time to Event, where Events include death from any cause;

hospitalization due to ALS-related event; tracheostomy (for respiratory failure, saliva management, or both); need for respiratory support of greater than 22 hour per day for 7 days. A further secondary endpoint is Combined Assessment of Function and Survival (CAFS). Key additional endpoints include Pharmacokinetic measurements; ALS biomarkers (e.g., serum neurofilament, IL-18 and/or IL-18 binding protein); and Exploratory patient-reported outcome scales.

SUMMARY: Dysregulation of cortisol levels in patients with ALS, along with cortisol's proinflammatory effects in the CNS, provide a strong rationale for the role of SGRMs, like dazucorilant, in the treatment of ALS. DAZALS will be the first study assessing whether GR modulation with dazucorilant can reduce the neurotoxic effects of cortisol activity and benefit patients with ALS by slowing functional loss (NCT05407324, EudraCT 2021-005611-31). The ENCALS risk profile score will be used to assess eligibility, so that a homogeneous patient population with a similar predicted prognosis will be enrolled.

All patents, patent publications, publications, and patent applications cited in this specification are hereby incorporated by reference herein in their entireties as if each individual publication or patent application were specifically and individually indicated to be incorporated by reference. In addition, although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

The invention claimed is:

1. A method of treating a subject suffering from amyotrophic lateral sclerosis (ALS) by providing said patient with greater dazucorilant exposure than the fasted dazucorilant exposure for treating ALS, the method comprising administering to the subject, by oral administration with food, an effective amount of 150 milligrams (mg) or 300 mg of dazucorilant, (R)-(1-(4-fluorophenyl)-6-((4-(trifluoromethyl)phenyl) sulfonyl)-4, 4a, 5,6,7,8-hexahydro-1-H-pyrazolo [3,4-g]isoquinolin-4a-yl) (pyridin-2-yl) methanone:

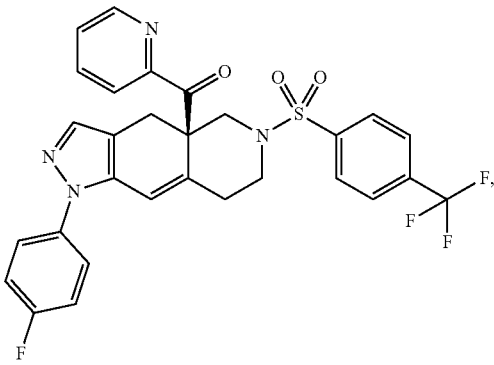 [SMILES: O=C(c1ccccn1)[C@]12Cc3cnn(-c4ccc(F)cc4)c3C=C1CCN(S(=O)(=O)c1ccc(C(F)(F)F)cc1)C2]

formulated in a LFCS Type IV lipid formulation in a softgel capsule containing dazucorilant, thereby increasing dazucorilant exposure by about 1.3-fold to about 1.7-fold as compared to the dazucorilant exposure of said effective amount of dazucorilant when administered without food to a fasted subject, effective to provide the patient with greater dazucorilant exposure than the fasted dazucorilant exposure for treating said ALS in the patient.

2. The method of claim 1, wherein said effective amount of dazucorilant is 150 mg of dazucorilant.

3. The method of claim 1, wherein said effective amount of dazucorilant is 300 mg of dazucorilant.

4. The method of claim 1, wherein said dazucorilant administration comprises once-daily dazucorilant administration for at least 14 consecutive days.

5. The method of claim 1, wherein said effective amount of dazucorilant is contained in one or more softgel capsules.

6. The method of claim 1, further comprising administration of a further therapy for ALS.

7. The method of claim 6, wherein said further therapy for ALS comprises administration of riluzole or edaravone.

8. The method of claim 7, wherein said further therapy for ALS comprises administration of riluzole.

9. The method of claim 7, wherein said further therapy for ALS comprises administration of edaravone.

10. The method of claim 1, wherein said oral administration of dazucorilant with food comprises at least 7 consecutive days of oral dazucorilant administration with food and treats a symptom associated with ALS is selected from weakness of the upper limbs, weakness of lower limbs, dysarthria, and dysphagia in said patient.

11. The method of claim 10, wherein said symptom associated with ALS is weakness of the upper limbs or weakness of the lower limbs.

12. The method of claim 1, wherein said oral administration of dazucorilant is once-daily oral administration of dazucorilant.

13. The method of claim 1, wherein said oral administration with food is daily administration of dazucorilant continued for at least 7 consecutive days.

14. The method of claim 13, wherein said daily oral dazucorilant administration with food continued for at least 7 consecutive days is effective to increase dazucorilant plasma levels in the patient by about 1.5-fold as compared to the dazucorilant plasma levels resulting from the first day of said oral dazucorilant administration with food.

15. The method of claim 13, comprising further daily oral administration of dazucorilant with food on additional days after said 7 consecutive days of daily oral dazucorilant administration with food, effective to achieve a steady-state level of dazucorilant in the plasma of said patient.

16. The method of claim 1, wherein said softgel capsule contains about 75 milligrams of dazucorilant.

* * * * *